United States Patent

Blake et al.

[15] 3,665,112

[45] May 23, 1972

[54] MULTI-LINE TELEPHONE SET WITH SWITCHING CAPABILITY

[72] Inventors: Richard K. Blake, Athens; Haresh C. Jotwani, Morrow County, both of Ohio

[73] Assignee: North Electric Company, Galion, Ohio

[22] Filed: Aug. 25, 1969

[21] Appl. No.: 852,677

[52] U.S. Cl. ....................179/99, 179/18 B

[51] Int. Cl. ....................H04m 1/00

[58] Field of Search ....................179/99, 1 CN, 18 BC, 18 AD, 179/27 DA, 18 AF

[56] References Cited

UNITED STATES PATENTS

| | | | |
|---|---|---|---|
| 1,097,760 | 5/1914 | Koltonski | 179/99 |
| 2,845,492 | 7/1958 | Kaye et al. | 179/99 |
| 3,342,944 | 9/1967 | Barbato et al. | 179/18 AD |
| 3,433,902 | 3/1969 | Butcher et al. | 179/81 |
| 3,517,133 | 6/1970 | Knight et al. | 179/18 AF |
| 2,975,237 | 3/1961 | Abbott | 179/99 |
| 3,287,499 | 11/1966 | Brightman | 179/1 CN |
| 3,551,606 | 12/1970 | Chapman | 179/99 |

*Primary Examiner*—William C. Cooper
*Assistant Examiner*—William A. Helvestine
*Attorney*—Johnson, Dienner, Emrich, Verbeck & Wagner

[57] ABSTRACT

A four-wire multi-line telephone set for sending and receiving priority or non-priority calls which set includes a plurality of line termination circuits programmable by plug and socket connections for various modes of operation, whereby the lines connected to the set may be individually connected to a switching center either separately or in parallel with lines of other multi-line sets, or the lines may be individually connected directly to lines of other multi-line sets. A plurality of relays and associated logic circuits of the multi-line set establish separate transmit and receive paths for each line and conference connections between the lines connected to the set, or between lines of a plurality of multi-line sets.

26 Claims, 16 Drawing Figures

Patented May 23, 1972 3,665,112

13 Sheets-Sheet 1

INVENTORS

RICHARD K. BLAKE
HARESH C. JOTWANI

BY

Brown Jackson Boettcher & Dienner

ATTORNEYS

Patented May 23, 1972

3,665,112

13 Sheets-Sheet 2

INVENTORS

RICHARD K. BLAKE
HARESH C. JOTWANI

BY

Brown Jackson Boettcher & Dienner

ATTORNEYS

INVENTORS

RICHARD K. BLAKE
HARESH C. JOTWANI

BY Brown Jackson Boettcher & Dienner

ATTORNEYS

INVENTORS

RICHARD K. BLAKE
HARESH C. JOTWANI

BY

Brown, Jackson, Boettcher & Dienner

ATTORNEYS

INVENTORS

RICHARD K. BLAKE
HARESH C. JOTWANI

BY

Brown Jackson Boettcher & Dienner
ATTORNEYS

INVENTORS
RICHARD K. BLAKE
HARESH C. JOTWANI
BY Brown Jackson Boettcher & Dienner
ATTORNEYS

INVENTORS
RICHARD K. BLAKE
HARESH C. JOTWANI

BY *Brown, Jackson, Boettcher & Dienner*
ATTORNEYS

INVENTORS

RICHARD K. BLAKE
HARESH C. JOTWANI

BY Brown, Jackson, Boettcher & Dienner

ATTORNEYS

INVENTORS
RICHARD K. BLAKE
HARESH C. JOTWANI

BY Brown Jackson Boettcher & Dienner
ATTORNEYS

INVENTORS
RICHARD K. BLAKE
HARESH C. JOTWANI

BY Brown Jackson Boettcher & Dienner

ATTORNEYS

INVENTORS
RICHARD K. BLAKE
HARESH C. JOTWANI

BY Brown Jackson Boettcher & Dienner
ATTORNEYS

SIGNAL RESPONSIVE CIRCUIT SR

INVENTORS
RICHARD K. BLAKE
HARESH C. JOTWANI

BY

ATTORNEYS

INVENTORS
RICHARD K. BLAKE
HARESH C. JOTWANI

BY Brown, Jackson, Boettcher & Dienner
ATTORNEYS

MULTI-LINE TELEPHONE SET WITH SWITCHING CAPABILITY

The invention herein described was made in the course of or under a contract or subcontract therein with the Department of the U.S. Air Force.

BACKGROUND OF THE INVENTION

1. Field of the Invention

The present invention relates to multi-line telephone sets and more particularly, to a multi-line telephone set switching network for connecting a plurality of lines in different operating modes.

2. Description of the Prior Art

To compensate for the rapid increase in modern day communication traffic, the switching capacities of existing switching centers are being increased, additional switching apparatus is being added to the switching centers, and new switching techniques are being developed which permit apparatus already present to be utilized more efficiently. In these approaches, the burden of keeping up with the flow of communication traffic has been placed on the switching centers.

An alternative approach is to transfer the control of some of the more simple connections to an operator controlled, multi-line telephone set. However, multi-line telephone sets presently available are generally limited as to flexibility and application. A typical set will, for example, provide only means for placing and answering calls, and means for manually placing a line on hold while another line is serviced. All other switching functions are completed in a switching center.

Furthermore, particularly in the case of certain sophisticated systems wherein the use of priority and non-priority levels for calls has become a predominant feature, it is necessary in known multi-line sets to provide an indication of the priority level of a call being received at a multi-line set.

SUMMARY OF THE INVENTION

Accordingly, it is an object of this invention to provide a multi-line end instrument capable of connecting a plurality of telephone lines for operation in a number of different modes, independently of a central switching system.

It is another object of the invention to provide a multi-line telephone set capable of connecting the transmit and receive lines of one four-wire line to the receive and transmit lines of another four-wire line directly, thereby connecting the lines in a conference mode independently of a central switching system.

It is a further object of this invention to provide a portable telephone set which includes a switching network capable of providing connections between a plurality of telephone lines independently of a switching center.

It is yet another object of the invention to provide a multi-line telephone set having a provision for distinguishing between incoming priority and non-priority calls.

It is a feature of the invention that the local line circuit of the multi-line telephone set is provided with visual and audible signal indicating means for providing distinct visual and audible signals in response to receipt of priority and non-priority calls.

It is yet another object of the invention to provide a multi-line telephone set having a plurality of line terminating circuits for providing separate transmit and receive paths for a plurality of four-wire lines connected to the terminating circuits, each line terminating circuit being programmable to permit a line connected to a terminating circuit to be connected in one of a number of operating modes.

It is another feature of the invention that any line connected to the line circuit of the multi-line set will be automatically placed on hold whenever another line is seized and becomes connected to the line circuit of the multi-line set.

In fulfilling such objects, the present invention provides a multi-line telephone set which includes a local line circuit having separate transmit and receive paths, a plurality of line termination circuits providing separate transmit and receive paths for a plurality of four-wire lines connected to the termination circuits, and a switching network for providing connections between the local line circuit and any of the line termination circuits so that the local line can be connected to one of the four-wire lines.

The multi-line telephone set also includes relays for interconnecting the line termination circuits to provide conference connections between lines connected to these circuits. Logic circuits associated with these conference relays are operable in response to the receipt of logic commands from logic circuits associated with each line termination circuit to connect the desired lines in conference.

The multi-line telephone set further includes means for providing distinct audible and visible indications which are indicative of the receipt of a priority or a non-priority call over any of the lines, means for indicating which of the lines has been seized by the console subscriber, and means for indicating which lines have been placed on hold.

Each line termination circuit includes means for coupling the transmit path of the local line circuit to a pair of transmit conductors of a four-wire line connected to the termination circuit and means for coupling the receive path of the local line circuit to a pair of receive conductors of the four-wire line. Each line termination circuit further includes a socket and a plug adapted to connect the line termination circuit for operation in a particular mode.

The multi-line set is capable of providing a conference connection between two or more of the lines which terminate at the set. The local circuit of the multi-line set may be connected in conference with the other lines. Moreover, two separate conferences can be established simultaneously.

When one of the line circuits of a multi-line set is connected directly to another line circuit of a second multi-line set, back-to-back operation between these instruments, including signalling therebetween, can take place independently of a central switching system. Moreover, by this back-to-back operation conference connections can be established between any of the lines connected to the two multi-line sets.

The multi-line set is also capable of providing party line operation with more than two four-wire parties connected to a single line.

In addition, automatic hold is provided for every line of the multi-line set whereby if two lines are seized, one after the other, the line which was seized first automatically is placed on hold.

Figure 1:
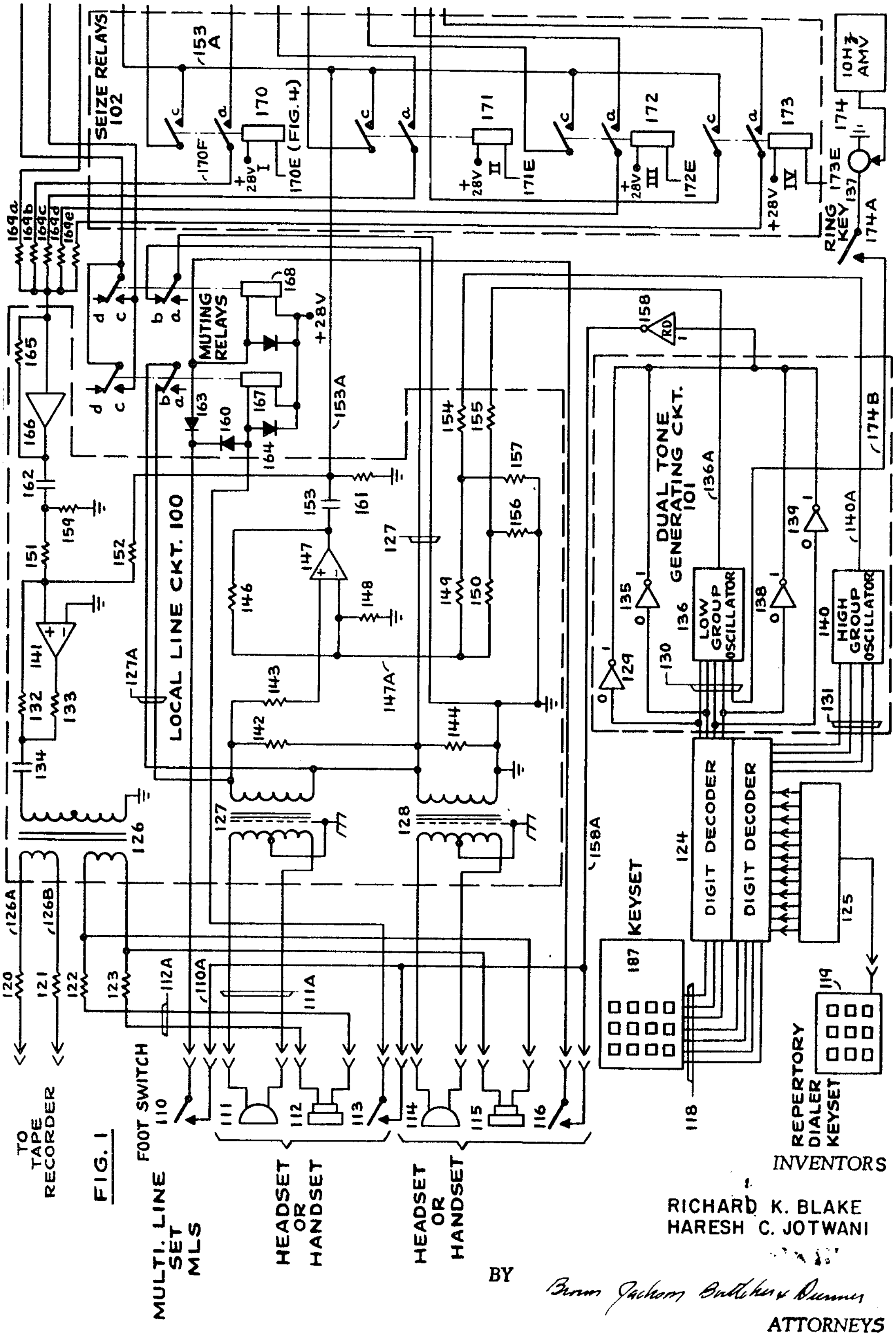
FIGS. 1 and 2 arranged as shown in FIG. 10 show the audio path of a local line circuit, line terminating circuits, and a network for connecting the terminating circuits to the local line circuit of a multi-line four-wire telephone set provided in accordance with the teachings of this invention.

In general, in the following description, the first digit of each reference numeral will refer to one of the above Figure numbers.

GENERAL DESCRIPTION OF A PREFERRED EMBODIMENT

Figures 1A, 10:
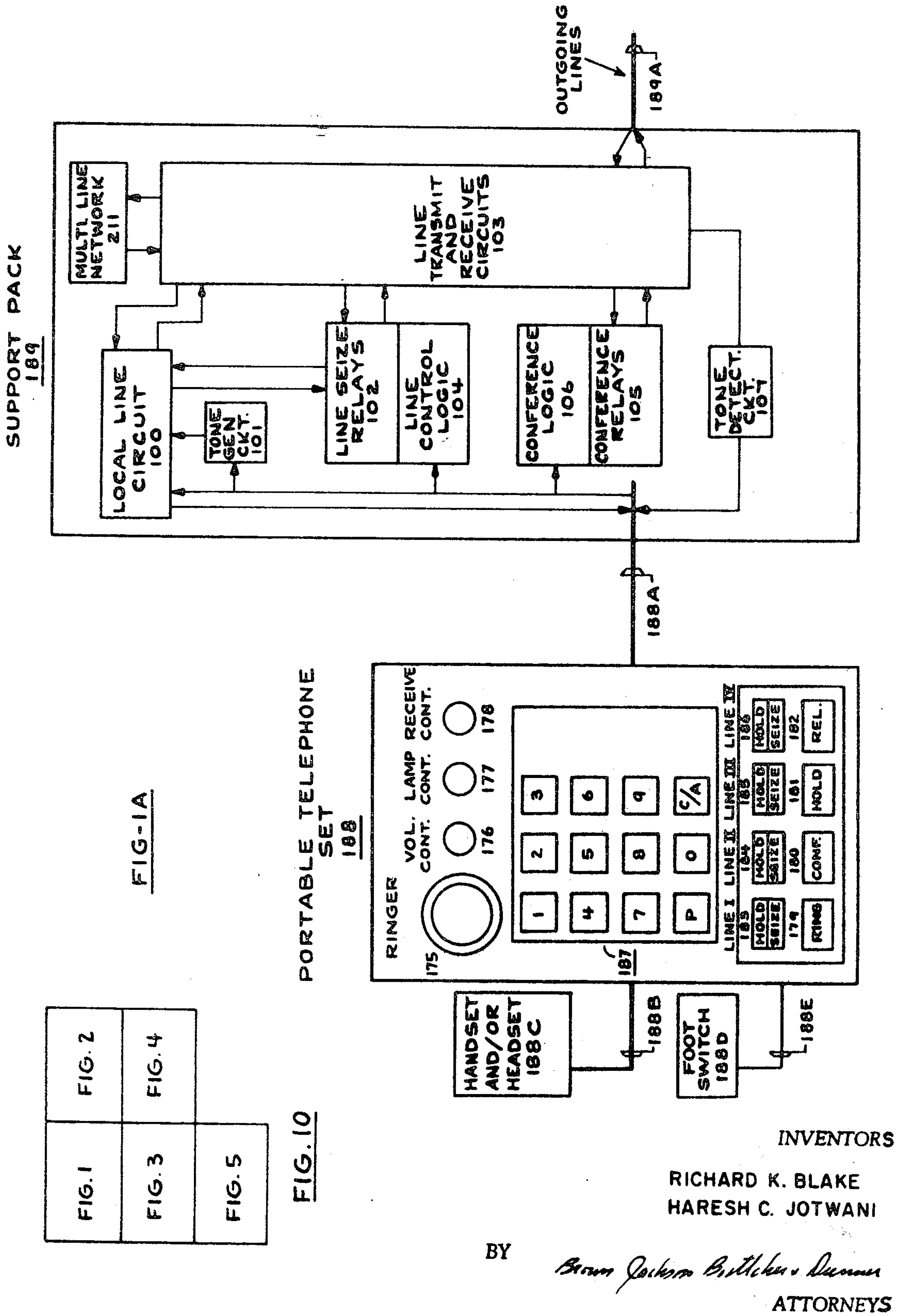
FIG. 1A shows, in block form, a control panel of a multi-line set and a package for switching and control circuitry of the multi-line set.
FIG. 10 shows the manner of assembling FIGS. 1–5.

Referring first to FIG. 1A, a multi-line telephone set according to this invention, is comprised of a console or control panel 188 and a support package 189 connected to the console 188 by a cable 188A. A handset and/or a headset 188C and footswitch 188D are connected to the console by cables 188B and 188E respectively. The console includes line seize and hold pushbuttons 183–186, and ring, conference, hold, and release pushbuttons or keys 179, 180, 181 and 182, respectively. Pushbuttons 183–186 and 180 when depressed each remain operated by means of a hold coil until said hold coil becomes deenergized. Pushbuttons 179, 181, and 182 are non-locking. The seizure of a line is established through the operation of one of the pushbuttons, such as 183–186.

The multi-line set employs conventional dual tone multi-frequency signalling for control purposes to a switching center (not shown). Keyset 187 on console 188 permits the console subscriber to signal parties connected to a switching center over one of the lines which are connected to the multi-line set. The keyset 187 includes 12 non-locking pushbuttons, 10 of which are numbered from 1–0, another labeled "P" for priority and the other labeled "C/A" for conference.

Ringing key 179 on the console 188 is used for direct signalling between two multi-line sets.

Figure 1B:
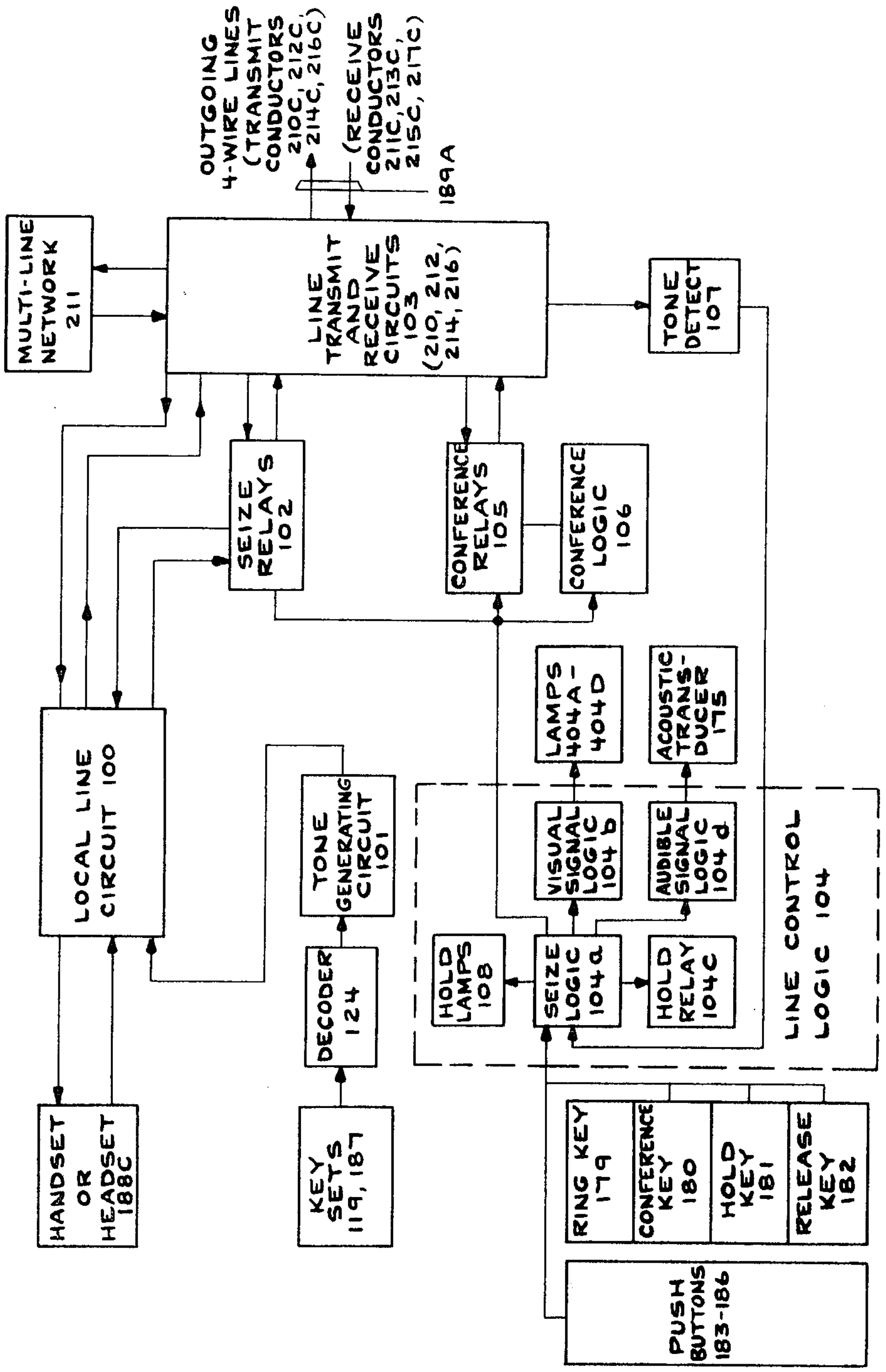
FIG. 1B is a block diagram of the multi-line set shown in FIGS. 1–5.

The console 188 further serves as mounting for an audible signalling device or ringer 175, controlled by audible signalling control gates **104*d* shown in FIG. 1B. A volume control 176, a lamp brightness control 177, and a receive level control 178 are also located on the console 188 to permit the console subscriber to adjust the volume of the ringer 175, and the brightness of lamps mounted beneath pushbuttons 183–186 and the pushbutton of keyset 187** which indicate a hold or a seize condition for the lines, and the sound level of the signals received at the handset.

The support package 189 houses all the digital and analog equipment for the multi-line set including a local line circuit 100 which provides separate transmit and receive paths for four-wire lines connected to the transmit and receive circuits 103 which provide terminations for the four-wire lines connected to an electronic switching center (not shown) or to another multi-line set. The line transmit and receive or line termination circuits 103 include line transformers and matching networks, to be described hereinafter with reference to FIGS. 7–9, for the receive and transmit paths for each of the four-wire lines.

In accordance with the present invention, the connections of the line termination circuits can be changed, through a plug and socket arrangement, to program each line of the multi-line set to operate in a number of different modes as will be described.

A plurality of seize relays 102 establish connections between the local line circuit 100 and the line transmit and receive circuits 103. The seize relays 102 are energized by line control logic gates 104 which, in turn, are operated by pushbuttons 183–186 on the console 188. "Nand"-type logic is used to control operation of the multi-line set.

The support package 189 also includes tone generator circuit 101 operated by keyset 187 on the console, and incoming tone detecting circuits 107 which convert ringing signals from an electronic switching center or from another multi-line set into signals for driving the acoustic transducer 175 mounted on the console 188, FIG. 1A, and lamps which are mounted on the console beneath the pushbuttons 183–186 to indicate the status of the lines.

Also included in the support package 189 are conference relays 105 and conference logic gates 106, also "Nand"-type logic, which are operable to provide bridging-type connections between two or more lines of one or more multi-line sets.

Referring now to FIG. 1B, which is a block diagram of the schematic circuit diagram of a multi-line set shown in FIGS. 1–5, to place an outgoing non-priority call, the console subscriber depresses one of the line seize pushbuttons 183–186 on the console 188, such as button 183 associated with line 1, which operates seize logic gates 104a to enable the one of the seize relays 102 which is associated with line 1. The contacts of such relay (to be described more fully hereinafter) connect the transmit and receive paths of the line connected to one of the transmit and receive circuit 103 to the local line circuit 100.

By way of example, it is assumed line 1 is connected to an electronic switching center (not shown). However, the line may also be connected directly to another multi-line set or may be connected to a line of another set through a multi-line, such as multi-line network 211 and thence to an electronic switching center.

The operation of seize and hold logic gates 104a also causes a hold relay **104*c*, such as relay 350 (FIG. 3) for line 1**, to be enabled. When operated, the hold relay closes a D.C. loop between a pair of conductors of the four-wire line to provide an indication of the status of the line as will be described.

The line seize logic gates **104*a* also control the visual signalling control gates 104*b* which in turn drive call lamps 404A–404D (FIG. 4) which are associated with pushbuttons 183–186, respectively. The call lamps are physically located beneath pushbuttons 183–186, which are of translucent material, on the console 188. Accordingly, seizure of line 1 will cause a lamp, such as lamp 404A, to light up pushbutton 183 associated with line 1**.

When dial tone is received over the receive conductor pair 211C (FIG. 2) of line 1 from a switching center (not shown) through the line transmit and receive circuit 210, the *a* contacts of the operated one of the seize relays in group 102, and the local line circuit 100, the console subscriber uses keyset 187 or repertory dialer 119 (FIG. 1) to operate a tone generating circuit 101 via digit decoder 124 to generate multi-frequency signals representative of the directory number of a called party. The multi-frequency signals are passed from the tone generating circuits 101 through resistors 154 and 155 through the local line circuit 100 to the switching center through the *c* contacts of the operated seize relay in group 102, the line transmit and receive circuit 210 for line 1 in group 103 and the transmit pair **210*c* of the four-wire conductors of line 1**.

The subscriber will receive a ringback signal until the called party answers, when the called party answers, a transmission path will be established.

To release the call, the console subscriber depresses release pushbutton 182 on the console 188 (FIG. 1A) which causes the line seize logic gates **104*a* (FIG. 1B) to be reset, the operated line seize relay of group 102 (FIGS. 1A and 1B), and the line hold relay 350 (FIG. 3) to be restored, and the seize lamp 404A** (FIG. 4) to be turned off.

Either priority or non-priority calls may be made using the multi-line set provided by this invention. In the case of an outgoing priority call, the subscriber depresses the priority digit key "P" before keying the directory number of the called party.

Referring to FIG. 1B, ringing tones from the switching center for indicating a call incoming to one of the lines of the multi-line set are received at one of the line transmit and receive circuits 103 and are passed to an incoming tone detector circuit 107. Different tones are provided for priority and non-priority calls, and the incoming tone detector circuit 107 distinguishes between the two tones and accordingly enables visual signalling control gates **104*b* and audible signaling control gates 104*d* by appropriate logic commands to cause the lamps 404A–404D (FIGS. 1B and 4) and the acoustic transducer 175 (FIGS. 1A, 1B and 5**) to be driven at different rates indicative of the priority or non-priority status of the incoming call.

The priority ringing signal consists of 600 Hz and a 425 Hz tone frequency shifted at a 10 Hz rate with a duty cycle of one second on and one second off. The non-priority signal consists of a 600 Hz tone modulated at 10 Hz and is on for two seconds and off for four seconds.

In response to the receipt of a priority call, one of the lamps 404A–404D (FIG. 4) will flash at the priority rate of 0.25 seconds on and 0.25 seconds off and transducer 175 will be driven by a signal at the priority rate of one second on and one second off. The audible and visual signalling will cease when the called line is seized. For an incoming non-priority call, one of the lamps 404A–404D will flash at the non-priority rate of 0.5 seconds on and 0.5 seconds off and the transducer 175 will be audible for 2 seconds and will be turned off for 4 seconds until the call is answered.

It is pointed out that if a line is being called on a non-priority basis, the ringing signal for an incoming priority call subsequently received will override the non-priority signal and the transducer 175 will be driven at the priority rate. However, the seize lamps for both lines will be flashing, one lamp at the priority rate and the other lamp at the non-priority rate.

The multi-line set includes an automatic hold feature whereby any line seized by the console subscriber will be automatically placed in a hold condition whenever another line simultaneously is seized. To this end, the line seize logic gates 104*a* (FIG. 1B) include a hold latch circuit, such as gates 344–345 (FIG. 3) of line 1, which maintains the hold relay, such as relay 350 of line 1, energized thereby keeping the D.C. supervision loop closed. A seized line may also be placed on hold by depressing the hold key 181 located on the console 188.

When a line, such as line 1, is placed on hold, the seize lamp 404A for line 1 is extinguished and a hold lamp 108 such as lamp 320 (FIG. 3) for line 1 is lit. The hold lamps 108 are also physically located beneath pushbuttons 183–186 on the console 188 and light up the corresponding pushbutton to indicate which line is on hold. A line kept on hold can be reconnected to the local line circuit by depressing the corresponding line seize pushbutton 183–186.

Conference relays 105 (FIGS. 1A and 2) permit a bridging-type connection to be established between two or more lines connected to the multi-line set. The contacts of the conference relays 105 provide a direct connection between two or more lines by connecting the transmit and receive paths of one four-wire line to the receive and transmit paths of one four-wire line to the receive and transmit paths of another four-wire line, etc. If the console subscriber is talking to a party on line 1, for example, and wishes to establish a conference connection between the party on line 1 and another party, the console subscriber seizes another line, such as line 2, by depressing the line 2 seize pushbutton 184. This causes line 1 to be automatically placed on hold. The console subscriber keys in the directory number of the party desired in conference and the multi-frequency signals are transmitted to the switching center in the manner described above. When the called party is reached, the hold condition on line 1 is overridden by depressing the conference key 180 on the console 188 (FIG. 1A) and then depressing the line seize pushbutton 183 for line 1. Line 2 remains seized. When two lines are seized in this manner, pertinent selected gates of the conference logic 106 are operated and one of the conference relays 106, such as relay 202 (FIG. 2) is energized to complete the connection between the transmit and receive paths of the lines to be connected in conference.

If lines 1 and 2 remain seized, the transmit and receive paths of both lines are connected to the local line circuit 100 of the multi-line set and the console subscriber can take part in the conference. On the other hand, a second conference can be set up between two other lines simultaneously with but independent of the conference between lines 1 and 2. This is done by first placing lines 1 and 2 on hold by depressing the hold key 181 and then establishing a separate conference between lines 3 and 4 in the manner described above. Lines 1 and 2 still remain connected together by conference relay 202 when the lines are on hold. This feature is provided through the operation of the conference logic gates 106. The conference connections will be released and the conference relays restored when the release key 182 is depressed or when one of the parties goes "on hook."

DETAILED FUNCTIONAL DESCRIPTION

The operation of the circuits described above and the functions of the individual components of the multi-line circuit can be shown more clearly by describing their operations with reference to the making or receiving of a call via one of the lines. Accordingly, the various features, operating characteristics, and circuit interconnection are discussed in detail under the following headings:

1. Outgoing non-priority call.
2. Outgoing priority call.
3. Incoming non-priority call.
4. Incoming priority call.
5. Conference.
6. Multiple Appearance and Programming Capability.

A master reset circuit 333A is provided to reset the hold and seize control logic circuits 104A and 104C and to connect the logic voltages, positive 5 volts, negative 12 volts, and zero volts to appropriate leads in the system when the power is first turned on.

1. Outgoing Non-Priority Call

Figure 2:
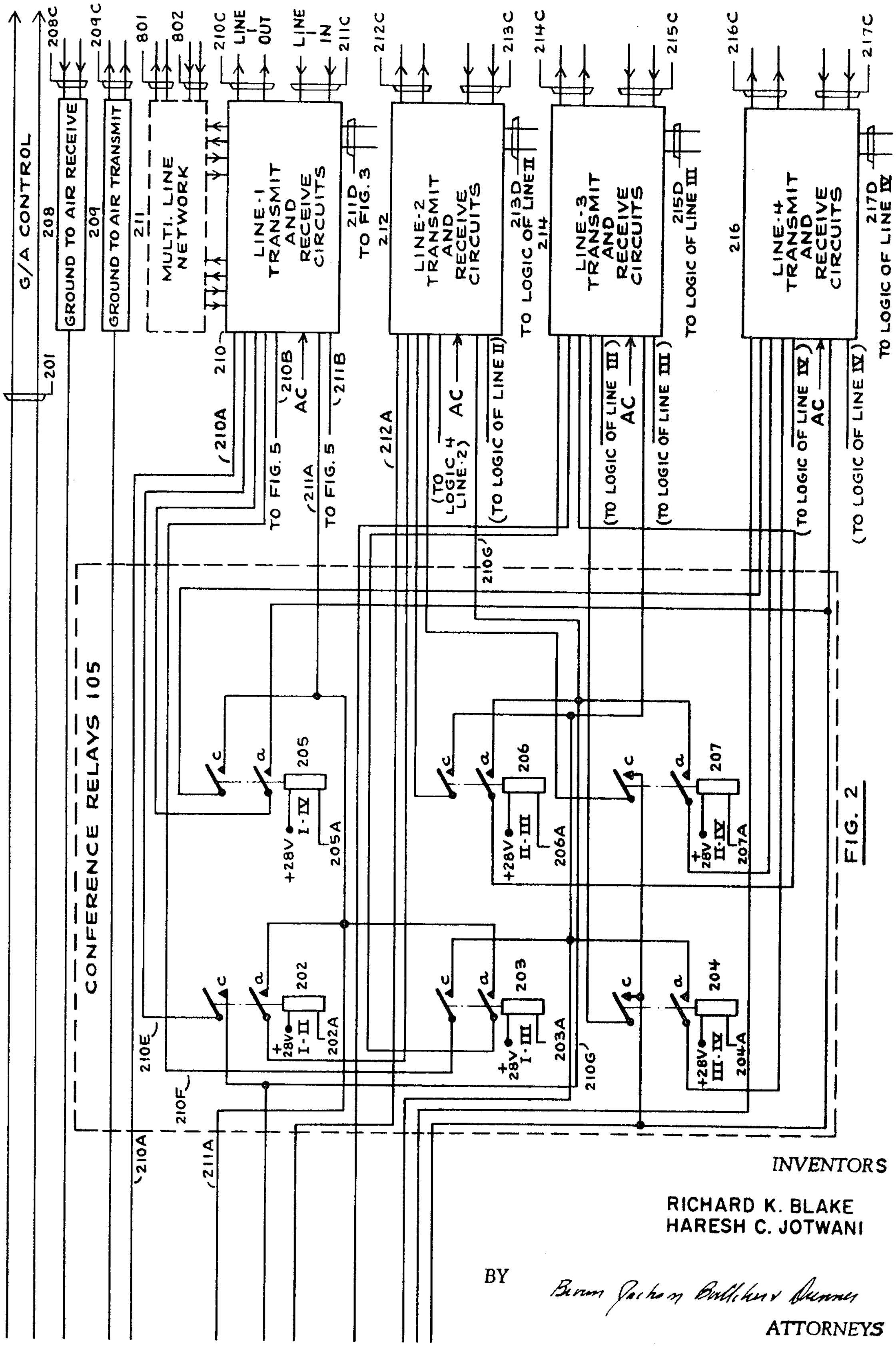
Figure 3:
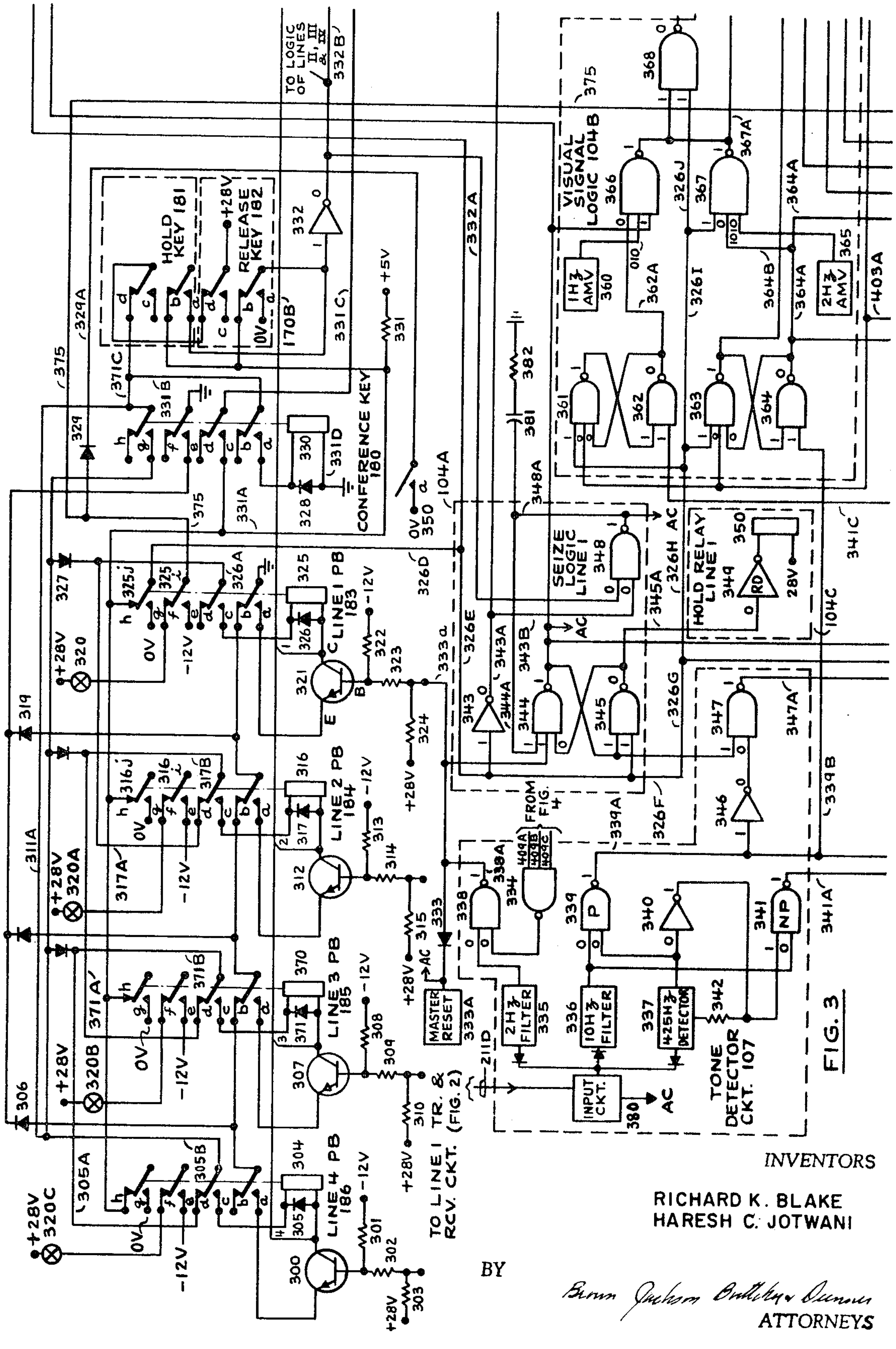
FIGS. 3, 4 and 5, when put together as shown in FIG. 10, illustrate the analog and digital control circuits associated with one line of a multi-line set.

Referring to FIGS. 1–5, the manner in which an outgoing non-priority call is placed will now be described. For the purpose of illustration, it is assumed that the console subscriber decides to make a call over line 1 and that line 1 is connected directly (i.e. programmed) to an electronic switching center (not shown) by means of the program plug 702 (FIG. 7) placed into the jack 700, it being understood that jack 702 has pins 1–25 which are inserted in recepticles 1–25 of jack 700, the connections on jack 702 being made by printed circuitry on jack 702 schematically shown as solid lines, corresponding connections being indicated for convenience on the jack 700 as dotted lines. To originate the call, the console subscriber presses seize pushbutton 183 (FIG. 1A), which operates an associated plunger opening contacts 325*b*, 325*d*, 325*f* and 325*h* and closing contacts 325*a*, 325*c*, 325*e* and 325*g* (FIG. 3). Accordingly, a ground is applied over contact 325*a* to the emitter of transistor 321 which is normally in the cut-off state. At this time, the base of transistor 321 is slightly positive by virtue of connection to the positive voltage via voltage divider comprised of resistors 322–324 which is connected between a positive 28-volt supply and a negative 12-volt supply.

The collector of transistor 321 is connected to the hold coil 325 associated with pushbutton key 183 and when transistor 321 is conducting, hold coil 325 is energized over a circuit extending from ground over contact 325*a*, transistor 321, hold coil 325, contact 325*c*, conductor 326A, conductor 317A, contact 316*d*, conductor 317B, conductor 371A, contact 370*d*, conductors 371B and 305A, contact 304*d*, conductors 305B, 311A and 371C, contact d of the hold button, and contact *d* of the release button to a positive 28-volt supply.

When transistor 321 is conducting, its collector is at ground potential, and such potential, via conductor 170B, operates seize relay 170 (FIG. 1). Operation of relay 170 causes contact 170*a* to close, connecting the receive output of line 1 transmit and receive circuit (or line terminating circuit) 210 via conductor 211A and resistor 169*b* to the input of summing amplifier 166. Similarly, relay 170 at contact 170*c* connects a transmit path from output conductor 153A of the local line circuit 100 to conductor 210A of line termination circuit 210.

When pushbutton 183 (FIG. 1A) was depressed, hold coil 325 was energized and a ground (logic 0) was placed on lead 326D via contact 325*g* of relay 325. This signal is, in turn, passed via conductor 326E and 326F to the second input of gate 345 to change its state which in turn via conductor 345A enables relay driver 349, to operate relay 350. The 1 and 0 markings on the drawings, FIGS. 1–5, represent the status of the logic gates in the idle condition when the multi-line set is not in use. This same logic 0 is also applied to the second input of logic gate 368 over a circuit which extends from contact 325g of relay 325 over conductors 326D, 326E, 326F, 326G, 326H, and 326J to cause the output of gate 368 to change to a logic 1 causing 5 volts (logic 1) to energize lamp driver 401, lighting lamp 404A of line 1 to indicate to the console subscriber that line 1 has been seized.

When gate 345 changes state, a logic 1 at the output of the gate is passed to the third input of gate 344. Since all three inputs of gate 344 are logic 1 the output of gate 344 becomes a logic 0. This output is passed to the first input of gate 345 latching gate 345 so that the output of gate 345 remains a logic 1 regardless of the state of its second input connected to lead 326F. Gates 344 and 345 form a hold latch circuit which keeps hold relay 350 operated when line 1 is placed on hold. Gate 345 will remain latched causing the hold relay to remain operated, until gate 344 is reset, in response to depression of release key 182.

Referring to FIG. 1, the operation of seize relay 170 completes an audio path from the console subscriber's position over the local line circuit 100 of the multi-line set and the line terminating, or transmit and receive circuit 210 transmit and receive conductor pair 210C and 211C of the four-wire line connected to the switching center.

Figure 7:
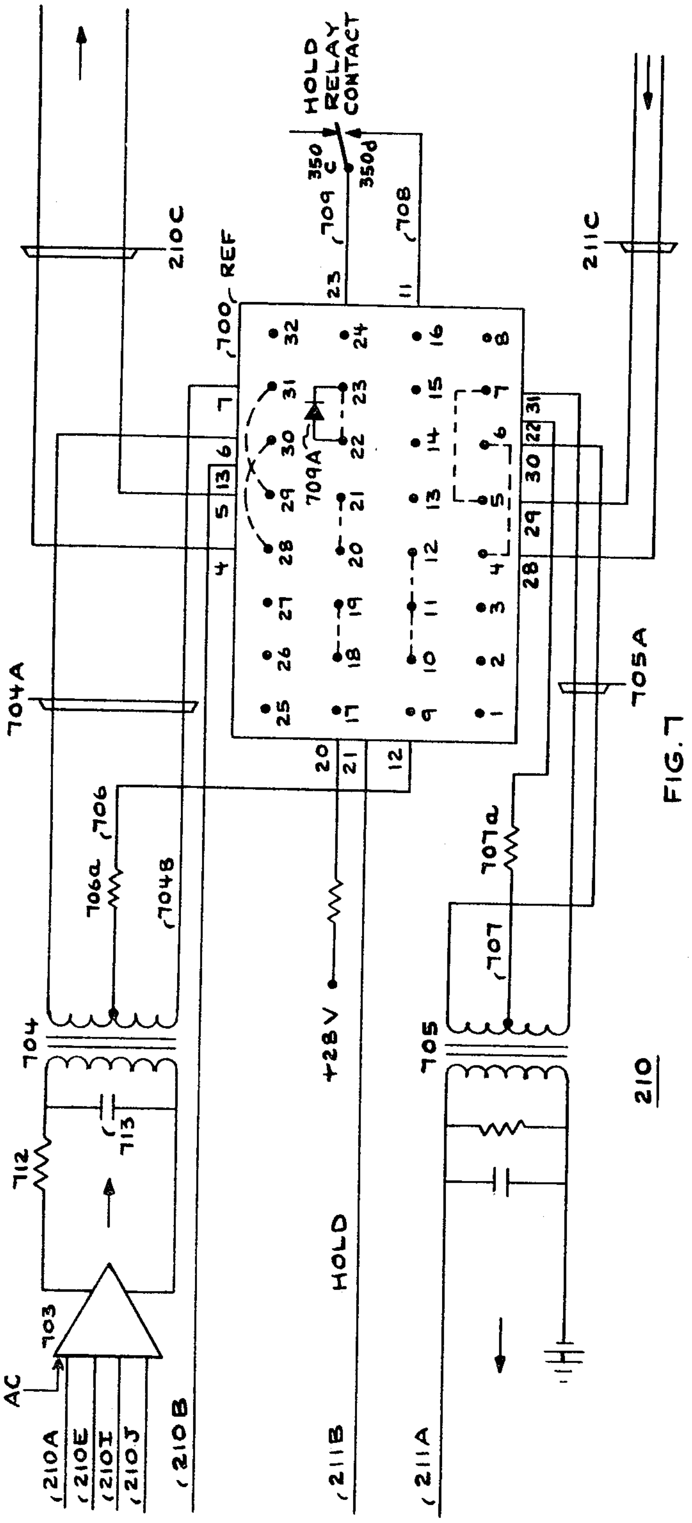
FIG. 7 is a circuit diagram of a four-wire line connected for operation in an electronic switching center mode.
Figure 7B:
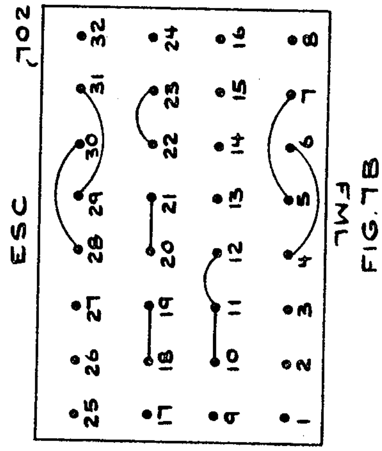
FIGS. 7A and 7B show schematic representations of plugs for use in programming a line terminating circuit for different modes of operation.

The line terminating circuit 210 for line 1, shown in FIG. 7, includes a socket 700 to which are connected the incoming and outgoing conductors 211C and 210C associated with a four-wire line. Incoming conductor pair 211C is connected to pins 28 and 29 of socket 700 and via a plug, such as plug 702 shown in FIG. 7B is extended to pins 30 and 31 and to transformer 705 via path 705A. A secondary winding of transformer 705 is connected to conductor 211A (FIG. 2) and to contact 170a of seize relay 170.

Inputs to the transmit path of line 1 are received via conductors 210A, 210E, 210I or 210J (FIGS. 2 and 7) at input amplifier 703, passed to transformer 704 and, via path 704A, are extended to pins 6 and 7 of socket 700. Plug 702 connects pins 6 and 7 to pins 4 and 5, respectively, and pins 4 and 5 are connected to conductor 210C, the transmit pair of the four-wire cable connected to the electronic switching center. Line transmit and receive circuits 212, 214 and 216 are similar to line transmit and receive circuit 210 and thus will not be described.

With an audio path thus established from the switching center to the console, the console subscriber receives the dial tone from the switching center (not shown) over line circuit 210 (FIGS. 1, 2, 7) via path 211A at the output of line circuit 210, contact **170*a* of relay 170, path 170F, resistor 169*b* at the input of summing amplifier 166, capacitor 162, resistor 151, side-tone amplifier 141, resistor 133, capacitor 134, transformer 126, and resistors 122, 123 to the receiver 112 of the headset or alternately to the receiver 115** of the handset.

The console subscriber keys in the directory number of the called party using either the associated pushbutton keyset 187 or a repertory dialer 119 which provides automatic preprogrammed digit sequencing to cause outpulsing of complete directory numbers responsive to depressing a single pushbutton. The dual tone multi-frequency signals generated as a result of depressing keys from either of the key senders are transmitted to the switching center over a path from the output of the oscillators 136, 140 over paths 136A and 140A, a resistive network including resistors 149, 150 and 154–157, path 147A to the input of the transmit amplifier 147, capacitor 153, conductor 153A, the contact **170*c* of relay 170 and thence via conductor 210A to transmit and receive circuit 210, and over circuit 210 to output conductors 210C**.

The path over transmit and receive circuit 210, with reference to FIG. 7, extends over input conductor 210A, amplifier 703, resistor 712, the primary winding of transformer 704, the secondary of transformer 704 and pins 6 and 7 of socket 700 through connections made by plug 702 to pins 4 and 5 respectively of socket 700 to conductors 210C.

After the complete number has been transmitted over such path to the switching center, and a connection is established at the switching center, ringback tone is sent back to the multi-line set (MLS) over the receive path described above. When the called party answers the conversation can ensue.

Whenever the console subscriber wishes to talk, it is necessary to operate a "push-to-talk" switch such as 110, 113, or 116 (FIG. 1). Such a switch may be embodied as a simple pushbutton or may be a foot switch 110.

Assuming that switch 110 is closed, the grounded output of relay driver 158 is then extended, via conductors 158A, 110A through switch 110, to the cathodes of diodes 163 and 160 permitting muting relays 167 and 168 to operate. Relays 167 and 168 at associated contacts 167b and 168b normally provide short circuits across the secondary windings of transformers 127 and 128 which are connected across transmitters 111 and 114, respectively. If switch 113 had been closed, relay 167 would have operated and, removing the short across the secondary of transformer 127. If switch 116 had been closed, relay 168 would have been operated, removing the short across the secondary of transformer 128.

It is pointed out, however, that when digits are being keyed into the input of any one of the inverters 129, 135, 138 or 139, the input to relay driver 158 is inhibited, and the output of relay 158 is such as to prevent relays 167 and 168 from operating. Accordingly, the short circuits will remain across transformers 127 and 128, and speech transmission from the console subscriber will be blocked whenever keyed digits are being sent.

After the conversation has been completed, the operator depresses the release key 182 on the console 188 (FIG. 1A) which causes the release key contact d (FIG. 3) to open and remove the positive 28 volts from the holding circuit for transistor 321 which turns off to deenergize hold coil 325. Turn off of transistor 321 also changes the potential on path 321C to relay driver 450 which in turn causes deenergization of seize relay 170, as seize relay 170 restores contacts **170*a* and 170*c* open (FIG. 1) to interrupt the audio path between line terminating circuit 210 and the local line circuit 100**.

At the same time, contact b of release key 182 interrupts the logic 1 supplied over resistor 331 to inverter 332 and the output of the inverter 332 momentarily becomes a logic 1. This logic 1 output is fed as the first input to gate 348 which changes state and, via its output over conductor 348A, resets gate 344 which in turn resets gate 345 causing relay driver 349 to be disabled restoring hold relay 350. It should be noted that a logic 1 at the output of inverter 343 remains true for a short time after relay 325 has been restored. The output of inverter 343 is "Nanded" with the output of inverter 332 by gate 348 and the output of gate 348 is used to reset gate 344.

In addition, the presence of a logical 1 on lead 326D over paths 326F and 326G, 326H, 326I and 326J resets gate 368, disables lamp driver 401, and turns off lamp 404A, and line 1 is restored to its idle condition.

2. Outgoing Priority Call

When it is desired to place an outgoing priority call over one of the lines, the operator seizes one of the lines, again assumed to be line 1 as above, in the same manner as the line was seized in the making of an outgoing non-priority call. However, before keying in the directory number of the called party, the console subscriber depresses the priority button "P" on keyset 187, causing a signal to be transmitted to the switching center over the described transmit path in the multi-line set, and over line circuit 210 and leads 210C indicating a request for a priority call. Accordingly, when the directory number is received at the switching center, a priority will be established with regard to the ringing of the called party. All other operations are the same as in the case of an outgoing non-priority call.

3. Incoming Non-Priority Calls

The main difference between incoming non-priority calls and incoming priority calls is that for non-priority calls, the ringing signal from the switching center is 600 Hz modulated with 10 Hz which is on 2 seconds and off 4 seconds, whereas the incoming ringing signals for a priority call is 600 Hz and 425 Hz frequency shifted at 10 Hz rate which is on 1 second and off 1 second. The differences between these two signalling tones is detected by filter circuits 335–337 (FIG. 3) and, through gates 339–347, is converted into appropriate logic signals which, in turn, are passed to gates 501–519 (FIG. 5) to control the acoustic indicating means 175 or ringer, physically located on the console 188, and to gates 361–364 and 366–368, which control the visual indicating means comprised of Lamp 404A. (Lines II, III, and IV would control lamps 404B, 404C, and 404D respectively).

Figure 5:
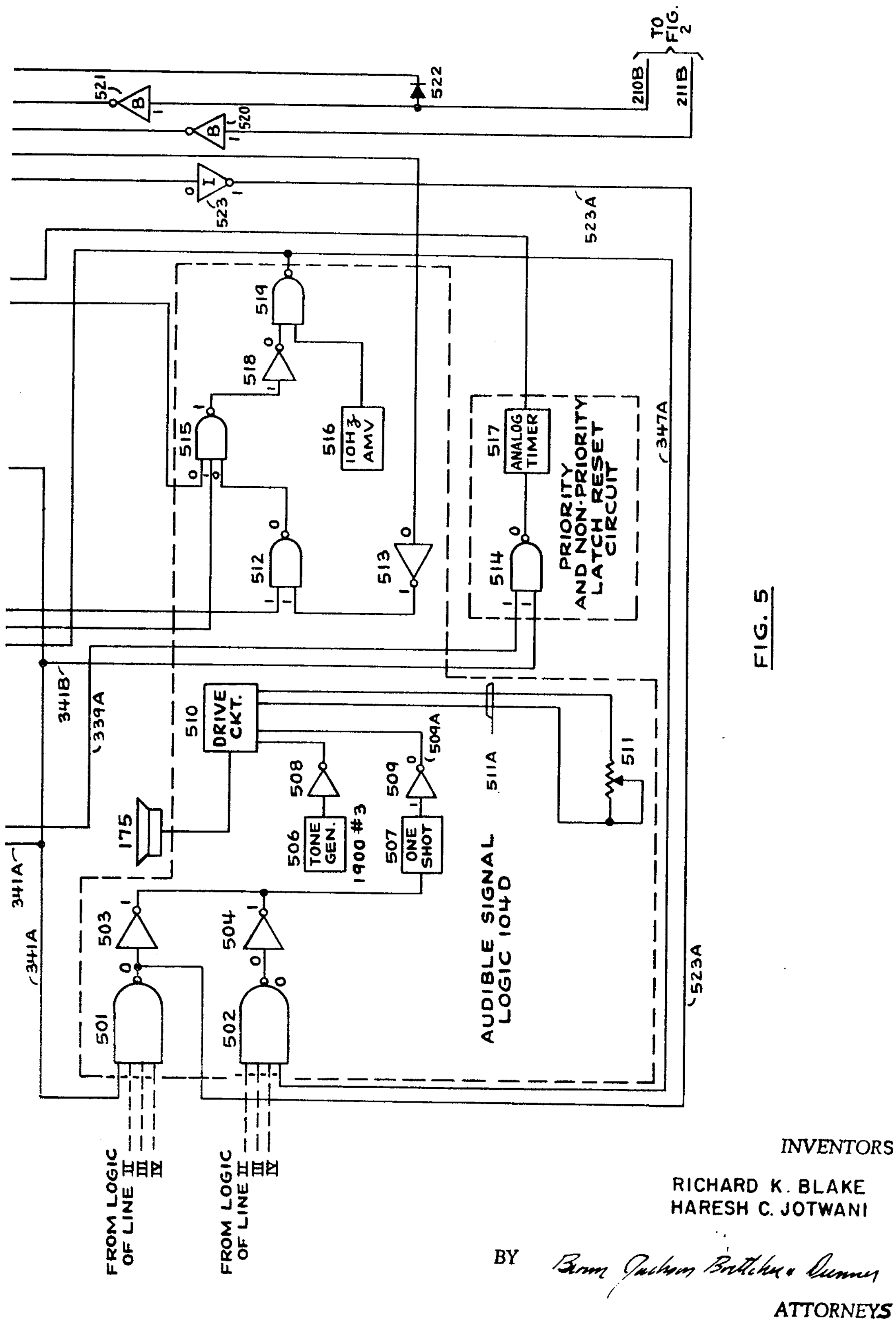

Considering first an incoming non-priority call, the ringing signal transmitted by the switching center is 600 Hz modulated with 10 Hz. This signal as received over conductor 211C (FIG. 2) at the input of transmit and receive circuit 210 for line 1 is passed to path 211D and thence to input circuit 380 (FIG. 3). The 10 Hz portion of the ringing signal will pass through a filter 336 providing a logic 1 level for two seconds and a logic 0 level for two seconds at the first input of gate 339 and at the second input of gate 341. Since the second input of gate 339 remains a logic 0, the output of gate 339 will not change. However, since the first input to gate 341 is normally a logic 1, the output of gate 341 will follow the 10 Hz ringing signal and hence, the output of gate 341 will be logic 0 for 2 seconds and then logic 1 for 4 seconds. The output of gate 341 is connected via conductor 341A to the input of gate 501 (FIG. 5). The output of gate 341 is also connected via conductors 341A and 341B to the second input of gate 514.

The output of gate 501 will follow gate 341 as it changes state in accordance with the ringing signal. The output of gate 501 is connected through an inverter 503 to a one-shot multivibrator 507 and the one-shot reconstructs the 10 Hz signal originally sent by the switching center to compensate for any changes in the signal waveform due to propagation through the logic gates. The output of the one-shot multi-vibrator 507 is inverted by gate 509 and, in turn, is gated into transducer driver 510 along with a 1,900 Hz signal from a tone generator 506 the output of which is also connected to an input of transducer driver 510 through an inverter 508. The presence of a signal at the output of inverter 509 permits the signal from tone generator 506 to actuate transducer driver 510 driving acoustic indicator 175. Accordingly, an audible non-priority 1,900 Hz tone is produced that is on for 2 seconds and off for 4 seconds.

As noted above, the output of gate 341 is also connected via conductors 341A and 341B to the second input of gate 514. The output of gate 341 changes the output of gate 514 which will then momentarily become a logic 1 and start analog timer 517 which begins timing for 6 seconds. The output of the analog timer 517 is connected to the second input of gate 361, and this output will be a logic 1 during the 6 seconds the timer is functioning.

The output of gate 341 is further connected via conductors 341A, 341B and 341C to the second input of gate 362 (FIG. 3). The momentary appearance of a logic 0 on the second input of gate 362 momentarily changes the output of gate 362 to a logic 1.

The output of 362 is connected to a third input for gate 361, and when the output of gate 362 is momentarily a logic 1, the output of gate 361 goes to a logic 0 and this output is fed back to the first input of gate 362 to maintain its output at a logic 1 irrespective of the input on lead 341C. Gates 361 and 362 function as a non-priority latch circuit. The output of gate 362, over lead 362A, makes the output of gate 366 follow the 1 Hz signal from astable multi-vibrator 360 which signal, through gates 366 and 368, energizes lamp driver 401 which, in turn, drives the seize lamp 404A of line 1 at a non-priority rate so the lamp is on for one-half second and off for one-half second.

When the operator sees lamp 404A flashing (and/or hears the audible tone emitted by transducer 175) it is an indication that a non-priority call is being received on line 1. Line 1 is then seized, by the same process described above in establishing an outgoing call whereby the seize and hold relays are operated and a speech path is established. Lamps 404B–404D would flash if a non-priority call were received over lines 2–4, respectively.

Referring for a moment to FIG. 7 in conjunction with FIG. 3, the operation of the hold relay 350 in response to the seizure of line 1 results in the closing of hold relay contact **350*d* in the line circuit 210 shown in FIG. 7 which as will be shown completes a D.C. path between conductors 708 and 709. More specifically, closing of contact 350*d* completes a path via conductor 709 to pin 23 of socket 700. Pin 23 is strapped to pin 22 via plug 702 (FIG. 7B) and pin 22 is connected to the center tap of the secondary of transformer 705, via conductor 707 and resistor 707*a*, and back to pin 31 of the terminal block, which is connected to pin 29 via plug 702, and to one of the conductors of transmit receive path 211C**.

The D.C. path is extended to the switching center by the conductor of receive pair 211C connected to terminal 28 of socket 700 and a conductor of transmit pair 210C, such as the conductor connected to pin 5. The rest of the D.C. loop can be traced from pins 5 and 7 to the center tap of the secondary of transformer 704 via conductor 704B through resistor **706*a*, to pin 12 via conductor 706 and pin 11 via plug 702 to contact 350*d***.

Thus, when line 1 is seized, the hold relay 350 is operated and contact 350d is closed. The D.C. loop provided by line termination circuit 210, for line 1, is detected by the switching center. The detection of this D.C. loop will be effective to stop the transmission of the ringing signal to the multi-line set from the switching center.

The call is terminated in the same way as for an outgoing call when the console subscriber depresses the release key 182 on console 188.

4. Incoming Priority Call

The operation of the multi-line set in response to receipt of an incoming priority call is similar to the procedure described with reference to a non-priority call. As mentioned above, however, the incoming ringing signal is 600 Hz and 425 Hz frequency shifted at 10 Hz rate which is on one second and off one second.

The incoming ringing signal is fed over path 211D from the line termination circuit 210 (FIG. 2) for line 1 to the input circuit 380 (FIG. 3). Since this is a priority signal, both the 10 Hz signal and the 425 Hz signals appear and when both inputs to gate 339 become logic 1, the output of gate 339 goes to a logic 0. The output of the detector 337 also goes to logic 1 and this output is inverted by inverter 340 and provides a logic 0 on the first input of gate 341. The output of gate 339 follows the 10 Hz signal present at its first input. Over lead 339A, this signal starts analog timer 517 by switching gate 514 (FIG. 5). The timer starts timing for 6 seconds during which time its output remains at a logic 1 level.

Simultaneously, the output of gate 339, over leads 339A and 339B, changes the output of gate 364 to a logic 1 the first time the second input to 364 goes to a logic 0. The output of gate 364 is connected to the third input to gate 363. The other inputs to gate 363 are also logic 1 at this time so the output of gate 363 becomes a logic 0. The output of gate 363 is connected to gate 364 so that once set to a logic 1, gate 364 will set, irrespective of changes in the input on its second lead, until it is reset. This particular combination of gates 363 and 364 is called the priority latch circuit.

The output of 364 is also passed, via conductor 364A through inverter 523 on lead 523A, to the output of gate 501. It should be noted that in response to the receipt of a non-priority call gate 501 has its output changed to a logic 1 and this signal through inverter 503, one-shot multi-vibrator 507, and converter 509, causes the audible indicator 175 to be energized.

It is pointed out that the state of gate 501 is changed in accordance with a change in the condition of one of its four inputs which, in turn, is indicative of the receipt of a non-priority call. However, whenever a priority call is being received, the output of inverter 523 is a logic 0 and gate 501 is inhibited so that a change at any of the four inputs to gate 501 is ineffective. Thus, if another line is being called on a non-priority basis at the same time, a priority ring will override and the transducer 175 will produce only the priority ring.

Returning to FIG. 3, the output of gate 339 is passed via lead 339A to the second input of gate 347 through inverter 346. When a priority tone is present, the input provided at the second input to gates 347 is a logic 1. Thus assuming that the line has not been answered, gate 347 will provide a logic 0 output which, in turn, is applied as the fourth input to gate 502 operating one-shot multivibrator 507 through inverter 504 and the transducer driver 510 through inverter 509 to gate the 1,900 Hz signal from tone generator 506 to transducer driver 510 in a manner similar to that in the case of the non-priority ringing. Thus, while the operation of gate 501 is inhibited over lead 523A, the priority ring command is gated via gate 502 through inverter 504, to drive one-shot multivibrator 507 to enable transducer driver 510 and the transducer produces the audible priority ring which is 1,900 Hz interrupted at 1-second intervals.

Returning again to the priority latch comprised of gates 363 and 364, the logic 1 level appearing at the output of gate 364 appears via leads 364A and 364B on the second input of gate 367. The first input of gate 367 is a logic 1 and the third input of gate 367 is receiving a 2 Hz signal from tone generator circuit 365. Consequently, the output of gate 367 will follow the 2 Hz signal and, over path 367A, will enable gate 368 which in turn will enable lamp driver 401 so that lamp 404 is driven at a 2 Hz rate 0.25 seconds on 0.25 seconds off.

Although the priority ring is effective to override an audible non-priority ring which may have been received prior to the receipt of the priority ring, the visual indication of an incoming non-priority call will still be provided and will be indicated by a slow flashing of the seize lamp for the line receiving the non-priority call signal. Thus, if there were both a priority and a non-priority call being received simultaneously, the console subscriber would be aware that one call is a priority both by the frequency of the audible tone being generated by transducer 175 and by the rate at which one of the seize lamps is flashing. The subscriber will know which line is receiving a non-priority call by the slower rate at which the seize lamp for that line is flashing.

If line 1 is on hold when called on a priority basis, the hold latch circuit (gates 344 and 345) inhibits gate 347 and thus, unlike in the case of a priority call received by an idle line, the normal path over conductor 347A to gate 502, is blocked by gate 347. An alternate path is provided by a hold override circuit consisting of gates 512, 515, 518 and 519.

Upon receipt of priority ringing tone by line 1 when on hold, the output of gate 344 of the hold latch circuit enables gate 512 and its output becomes a logic 1. The output of gate 512 is connected to a first input of gate 515. A second input of gate 515 is also a logic 1 indicating line 1 is not seized. A third input of gate 515 is connected to the output of gate 364 of the priority latch circuit and will be a logic 1 whenever the latch is set responsive to the receipt of a priority ringing signal over line 1.

Thus, when a priority ringing signal is received and line 1 is on hold, gate 515 is switched and, through inverter 518, the output of gate 515 is coupled to a first input of gate 519. A second input of gate 519 is connected to the output of astable multi-vibrator 516 which generates a 10 Hz signal for gating the output of gate 515 through gate 519 to the input of gate 502 to cause the transducer 175 to be driven modulated by the 10 Hz signal until the priority ringing signal ceases or for 6 seconds when the analog timer resets.

As in the case of non-priority calls being received, when line 1 is seized, the audible ringing is stopped when the loop closure provided in the line termination circuit 210 is detected by the switching center. The flashing of seize lamp 404A will stop when the second input to gate 368 becomes a logic 0 in response to the operation of relay 325 as described above in reference to seizure of a line for an outgoing call.

The call is completed in the same manner as an outgoing non-priority or priority call.

In a situation where the calling party initiates an on hook before the called party answers, the ringing is inhibited at the switching center, and the ringing signals are no longer received at the line termination circuit 210. The analog timer 517 times out after 6 seconds and resets both the priority latch (gates 363–364) and the non-priority latch (gates 361–362) so that the flashing of seize lamp 404A is stopped.

5. Conference

The multi-line set has the capability of providing conference connections between two or more lines either including or excluding the local line circuit 100.

For the purpose of illustration, it is assumed that the local line circuit 100 is connected to line 1 via seize relay 170 and line transmit and receive circuit 210, and that the party on line 1 would like to talk with another party. At this time, transistor 321 is conducting, hold relay 350 and seize relay 170 of line 1 are operated, and seize lamp 404A is lit.

The console subscriber depresses a pushbutton, such as button 184, on console 188 (FIG. 1A) to seize another line, such as line 2, which is assumed to be connected to the switching center. The seizure of line 2 is accomplished in a manner similar to that for the seizure of line 1 as described above for outgoing non-priority calls. When button 184 is depressed, operating an associated plunger, contacts **316*b*, 316*d*, 316*f*, and 316*h* are opened and contacts 316*a*, 316*c*, 316*e* and 316*g* are closed. Contact members 316*i* and 316*j*, shown unconnected in FIG. 3 would be connected to digital circuits 104*a* (FIG. 1A) for line 2. The circuits are similar to logic gates 343–348 provided for line 1 and connections to contact members 316*i* and 316*j* can be compared with connections to contact member 325*i* and 325*j* of relay 325 of line 1**.

When contact **316*d* is opened, the path between the positive 28-volt supply and the collector of transistor 321 is opened and coil 325 is released as transistor 321 turns off. However, since the hold relay 350 for line 1 is still operated, a ground or zero volt potential is provided via contact 350*a* of hold relay 350, path 329A and diode 329 to contact 325*f* of coil 325 to operate hold lamp 320. The lamp 320 lights indicating that line 1** is on hold.

Figure 4:
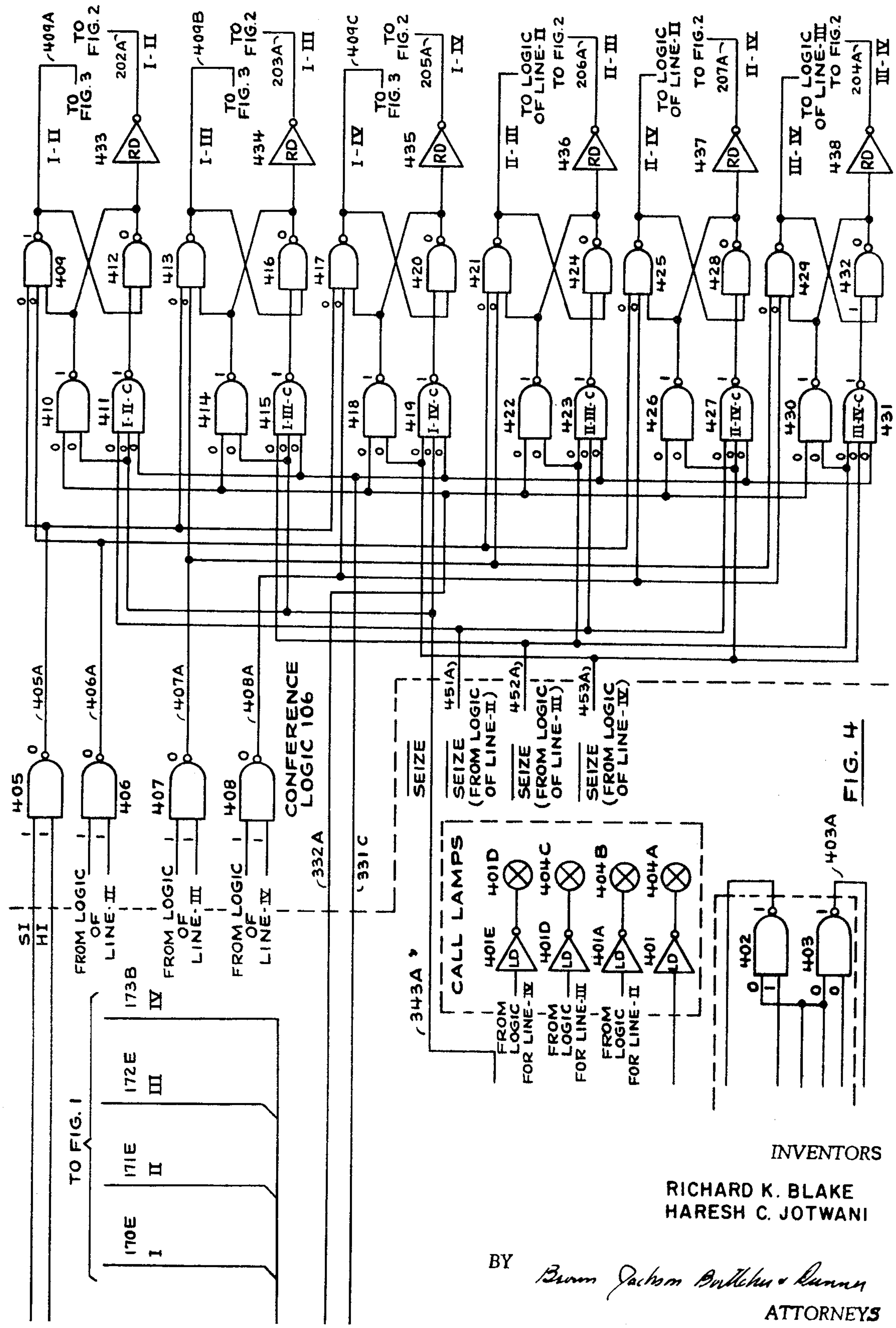

Since the seize relay 170 for line 1 is released, the logic 0 which was supplied over lead 326D through contact **325*g* is removed from the input to gate 405 of the conference logic shown in FIG. 4**.

The emitter of transistor 312 for line 2 is grounded via contact **325*b* of hold coil 325 and contact 316*a* of hold coil 316. The collector of transistor 312 is connected to a positive 28-volt supply through coil 316, contact 316*c* of coil 316, leads 317B and 371A, contact 370*d* of coil 370, leads 371B, and 305A, contact 304*d* of coil 304, leads 305B, 311A and 371C, contact d of hold key 181 and contact d of release key 182. Transistor 312 conducts and coil 316 remains energized when pushbutton 184** is released.

When line 2 is seized, a seize relay 171 is energized, a hold relay associated with line 2 (not shown) operates, and a seize lamp 404B for line 2 is lit.

When relay 171 operates an audio path, similar to that established with the seizure of line 1, is established via contacts **171*a* and 171*c* of relay 171 and conductors 212A and 210G between the local line 100 and line 2, transmit and receive circuit 212. Lead 210G is connected through contact 171*a* of relay 171 to resistor 169*c* at the input to summing amplifier 166**.

When the audio path has been established and dial tone is received the console subscriber keys the directory number of the called party and multi-frequency signals are transmitted to the switching center in the manner described above. When a connection is established between line 2 and the called party, the console subscriber depresses conference key 180, shown in FIG. 1A, which causes a holding path to be established for coil 330 (FIG. 3) from ground to positive 28 volts via lead 331D, contact 330*a*, conductors 331B and 371C, contact d of the hold key, and contact *d* of the release key.

Then line 1, which is on hold, is connected to line 2 by depressing the seize pushbutton 183 for line 1. When the contacts associated with hold coil 325 (FIG. 3) are moved from their normally unoperated position to their operated position, hold lamp 320 is extinguished as ground is removed from contact 325*g*, the emitter of transistor 321 is grounded via contact 325*a*, and the collector of transistor 321 is connected through coil 325, contact 325*c*, conductor 326A, diode 327, contacts 330*g*, conductor 371C, break contacts *d* of hold key 181, and break contacts *d* of release key 182 to +28V.

The effect of depressing conference key 180 is to provide an alternate path to ground over contact 330*e* of coil 330, diode 319 and contact 316*a* of coil 316 to the emitter of transistor 312 when contact 325*b* of pushbutton 183 is opened. Thus, transistors 312 and 321 will remain operated and coils 316 and 325 will remain energized.

When both lines 1 and 2 are seized, their seize lamps 404A and 404B are lit and the hold and seize relays for both lines are energized. Moreover, the transmit and receive paths for both lines are connected to the local line circuit 100 via relays 170 and 171.

A direct circuit connection is established between the transmit and receive paths of the two seized lines by means of one of the conference relays 202–207, such as relay 202 shown in FIG. 2, which connect the transmit path of one line directly to the receive path of another line and the receive path of the one path directly to the transmit path of the other line. Six relays 202–207 are provided to establish direct connections between the transmit and receive paths of any two of the four lines. Accordingly, line 1 can be connected to lines 2, 3 and 4 by relays 202, 203, and 205, respectively; line 2 can be connected to lines 1, 3 and 4 by relays 202, 206 and 207, respectively; line 3 can be connected to lines 1, 2 and 4 by relays 203, 206 and 204 respectively; and line 4 can be connected to lines 1, 2, and 3 by relays 205, 207, and 204 respectively.

The conference relays 202–207 are operated upon energization of relay drivers 433–438, shown in FIG. 4, which, in turn, are enabled by gates 405–432 upon receipt of appropriate commands at the inputs of these gates from the line seize and hold logic gates 104 (FIG. 1A).

In the example illustrative of the operation of a conference connection, after both lines 1 and 2 have been seized, both inputs SI–1 and HI–1 of gates 405 and 406 (FIG. 4) are logic 0 and the outputs of these gates become logic 1.

Since coil 330 is energized, a positive 5 volts (or logic 1) is connected to contact 330*c* via lead 331A through resistor 331 to an input of gate 411 via lead 331C.

A logic 1 also appears on leads 343A and 451A which connect the control logic of line 1 from FIG. 3 and the control logic of line 2, indicated, to second and third inputs of gate 411. Since the three inputs to gate 411 are all logic 1, the output of gate 411 becomes a logic 0 and the output of gate 412 becomes logic 1 thereby enabling relay driver 433 to energize relay 202.

When relay 202 operates, contact 202*c* connects conductor 210E to conductor 210G so that the transmit portion of terminating circuit 210 of line 1 is connected to the receive portion of terminating circuit 212 of line 2. Contact 202a of relay 202 connects conductor 211A to conductor 212E so that the receive portion of line termination circuit 210 is connected to the transmit portion of line termination circuit 212. Thus, a direct audio path is established between line 1, line 2, and the local line circuit.

Once conference relay 202 has operated, it will remain operated even if both lines are placed on hold. The logic 1 outputs of gates 405 and 406 are "Nanded" by the gate 409, and the output of gate 409 becomes a logic 0. Accordingly, gate 412 will continue to enable relay driver 433 as long as lines 1 and 2 are at least on hold. Relay 202 will remain energized until disabled as will be described.

A third party can be brought into the conference if desired, and the manner of making this connection is similar to that for connecting line 2 to line 1 in conference. First line 1 and line 2 are placed on hold and a third line, such as line 3, is accessed by depressing the seize button 185 for line 3. When line 3 is connected to the party desired, the conference is established by removing the hold condition on lines 1 and 2 by depressing conference key 180 and the seize buttons 183 and 184 for lines 1 and 2. Conference relays 202, 203 and 206 will be operated to provide the connections between the corresponding transmit and receive paths of line termination circuits 210, 212, and 214.

If during the conference one of the parties, such as the party on line 1, goes on hook, a disconnect tone, sent to the multi-line set from the switching center in response to the detection of the on hook condition, will be effective to cause transistor 321 to be turned off whereby hold coil 325 and conference relays 202 and 203 are disabled. The disconnect tone, comprised of a 425 Hz signal modulated by the 2 Hz signal will be sent to the multi-line set over receive conductors 211C to the line 1 transmit and receive network 210. The disconnect tone will be passed via path 210D to incoming tone detecting circuit 380 (FIG. 3) of line 1.

The disconnect tone is impressed on the inputs to filter circuits 335–337 with the 2 Hz signal passing through filter 335 to a first input of gate 338. A second input of gate 338 is connected to the output of gate 334, the inputs of which are derived from conference logic gates 106 of FIG. 4.

Digressing, since the output of gate 409 became a logic 0 in response to the seizure of both lines 1 and 2, a first input to gate 334 became a logic 0 and the second input to gate 338 became a logic 1.

Thus, when the disconnect tone is passed to the input of gate 338, gate 338 will follow the two Hz signal, and the first time the signal is positive (or appears to be a logic 1), the output of gate 338 will become a logic 0, and a ground will be applied to the junction of resistors 324 and 323, base bias supply of transistor 321, and the base of transistor 321 will be biased negative with respect to the emitter and transistor 321 will turn off.

A ground is also applied over lead 344A to an input of gate 344 causing the hold latch to be reset disabling relay driver 349 and deenergizing hold relay 350. When transistor 321 is cut off, hold coil 325 restores and seize relay 170 for line 1 is deenergized. When the seize and hold relays are disabled and the seize and hold logics 104*a* and 104*c* for line 1 is reset, the inputs to gate 405, 406 and 407 will become logic 1 and gates 409, 412, 413 and 416 are reset disabling relays 202 and 203 and thereby breaking the conference connections between line 1 and lines 2 and 3. In this manner, line 1 is restored to its normal idle condition while the operator's line circuit remains connected to lines 2 and 3 which are connected in conference.

The conference connections between line 1, line 2 and line 3 and the local line circuit of the set, can also be terminated by depressing release key 182. When the release key 182 is depressed, the positive 28 volts is removed from contact d of the release key and coils 370, 316, 325 and 330 are deenergized. Also, as contact *b* of the release key is opened, the positive 5 volts is removed from the input of inverter 332 and so the output of inverter 332 becomes a logic 1 and, over conductor 332B, the output of gate 348 is changed to logic 0. The output of gate 348 via conductor 348A, resets gate 344 causing gate 345 to be reset whereby relay driver 349 is deenergized and hold relay 350 is restored. Simultaneously, the line seize and hold logic and hold relays for lines 2 and 3 are reset.

When conference coil 330 is deenergized, logic 1 is removed from lead 331C and the output of gate 411 is set to a logic 1 causing the output of gate 412 to become a logic 0 and relay driver 433 to be deenergized. Conference relay 202 restores whereby the connections between the network of 210 of line 1 and the network 212 of line 2 are opened. In like manner, gates 415 and 423 are switched and gates 416 and 424 are switched so that relays 203 and 206 will be disabled and the conference connections between lines 1, 2 and 3 will be opened.

Thus far, it has been described how a single conference can be set up between a number of the lines and the local line circuit. It is also possible to establish two separate conferences including any combinations of the four lines, and the console subscriber may join in either conference.

For purposes of illustration, it is assumed that the console subscriber is in conference with the parties on line 1 and line 2, and that a call is incoming on line 3. The console subscriber depresses the hold key 181 which opens the path of the positive 28 volt supply to hold coils 330, 325 and 316, thereby restoring the conference coil and the coils of pushbuttons 183 and 184 resulting in the restoration of seize relays 170 and 171 for lines 1 and 2, respectively. The hold relay 350 for line 1 and the hold relay (not shown) for line 2 remain energized and, as described above, the hold lamps 320 and 320A for lines 1 and 2 are turned on. Also, the conference relay 202 which interconnects transmit path and receive paths of line 1 to the receive path and transmit paths respectively, of line 2, remains operated since the output of gate 409 is still a logic 0 and the output of gate 412 remains a logic 1. Thus, lines 1 and 2, while on hold, remain interconnected independently of the console subscriber.

Seize pushbutton 185 is depressed to seize line 3, and a seize relay 172, hold relay, and seize lamp of line 3 are operated as described above for line 1 and an audio path is established between the local line circuit and the party on line 3 via transmit and receive circuit 214, and contacts 172*a* and 172*c* of seize relay 172 of line 3.

Assuming the party on line 3 wishes to talk to a fourth party and the console subscriber wants to be included in the conference, a conference connection, separate from the connection involving lines 1 and 2, can be established.

Pushbutton 186 is depressed to seize line 4 whereby line 3 is automatically placed on hold. The seize relay 172 and pushbutton coil 370 for line 3 are deenergized. However, the hold relay (not shown) for line 3 remains energized and the hold lamp 320B is lit. The seize relay 173 and hold relay (not shown) and pushbutton coil 304 for line 4 are energized and seize lamp 401D for line 4 turns on. An audio path is thus established between the terminating circuit 216 of line 4 and the local line circuit 100.

When the console subscriber receives dial tone the directory number of the party sought is sent to the switching center using keyset 187 or repertory dialer 119, and when the party called answers, the console subscriber depresses the conference key 180 and then the seize pushbutton 185 of line 3 thereby causing the hold and seize relays for both lines 3 and 4 to be operated. In a manner similar to that described above for establishing a conference connection between lines 1 and 2, the simultaneous energization of seize and hold relays for lines 3 and 4 cause logic gates 429–432 to be switched and relay 204 to be operated thereby interconnecting the transmit and receive paths of lines 3 and 4 which in turn are connected to the local line circuit.

At this time, lines 1 and 2 are also connected in conference connection that is independent of the connection between lines 3 and 4. This feature is provided by the sequential operation of the conference logic gates 409–432. Thus, to energize one of the conference relays 202–207, the conference key must be depressed and then the lines to be interconnected must be seized to permit gates 411, 415, 419, 423, 427 or 431 to be enabled which in turn will enable gates 412, 416, 420, 424, 428 or 432, respectively, to energize the relay driver 433-438. Gates 412, 416, 420, 424, 428 and 432, once operated, will be latched on by gates 409, 413, 417, 421, 425 and 429, respectively, and remain latched even if the lines which control these gates are placed on hold. However, if a line is on hold, gates 411, 415, 419, 423, 427 and 431 are inhibited by the signal level on one of the leads 343A, 451A, 452A, and 453A connected to the inputs of these gates. Accordingly, while an existing conference connection such as that between lines 1 and 2 will be preserved when the lines are placed on hold, a new conference between either of these lines and another line cannot be established until the line on hold has been first seized.

If desired, the console subscriber may leave the conference between lines 3 and 4 and join the conference between the parties on lines 1 and 2, by depressing the hold key 181 to put lines 3 and 4 on hold, depressing conference key 180, and then pressing seize pushbuttons 183 and 184 for lines 1 and 2. There will still be two conferences existing independently of one another, the first between the party on line 1 and on line 2 and the console subscriber, and the second between the parties on line 3 and line 4. Seize lamps of line 1 and 2 will be lit while the hold lamps of lines 3 and 4 will be lit, indicating the status of the lines.

The calls are terminated by one of the methods described above.

6. Multiple Appearance and Programming Capability

Figure 6:
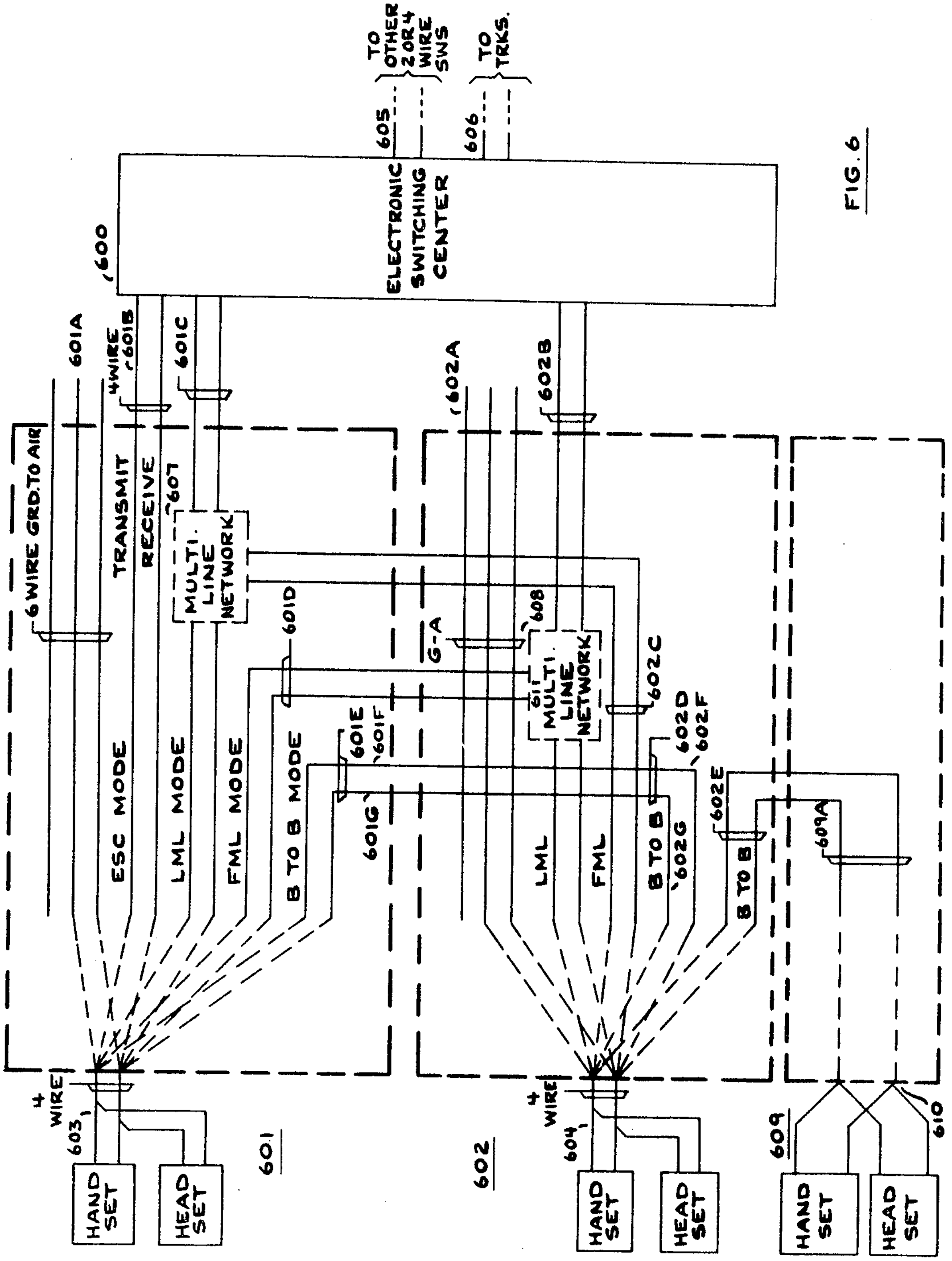
FIG. 6 shows a typical connection of the multiple appearance capability of the four-wire lines of three multi-line telephone sets.

Referring to FIG. 6, there is shown a schematic representation of how four-wire lines of a plurality of multi-line sets can be connected for operation in different modes. Subscriber set 601 provides terminations for five lines, 601A–601E. One of these lines, such as line 601A, is designed for ground-to-air transmission and reception capability. This line is included by way of example. However, this particular connection will not be discussed in detail in this application. Lines 601B–601E can be connected in any of the following modes:

1. Electronic switching center mode.
2. Back-to-back mode.
3. Local multi-line mode.
4. Foreign multi-line mode. Each of these connection modes will be described in detail. To emphasize the versatility of this set, all four modes of connection will be described and with reference to line 1 and transmit and receive circuit 210 for line 1.

1. Electronic Switching Center Mode

The programming for a line in the electronic switching center mode (ESC) connection was described in the foregoing description with reference to FIG. 7 in the example of placing an outgoing non-priority call. In the ESC mode, a four-wire line, is connected directly to a switching center 600. Referring to FIG. 7, the transmit and receive circuit, or line termination network 210 for line 1 is programmed for the ESC mode. Conductors 210C and 211C are connected to the transmit and receive paths of the multi-line set via socket 700 and plug 702 shown in FIG. 7B. Plug 702 programs line 1 for ESC mode when placed in socket 700 with the edge marked ESC adjacent the socket edge marked REF.

2. Back-to-Back Mode

In the back-to-back mode, illustrated in FIG. 6, a multi-line set, such as set 601, has one of its lines, such as line 601E, connected directly to a line, such as line 602D, of a second multi-line set, such as set 602. When two lines are connected together in this manner, it is possible to signal and communicate between the two multi-line sets 601 and 602 without providing a connection through a switching center 600.

As shown schematically in FIG. 6, line 601E of set 601 has transmit conductors 601F and receive conductors 601G connected directly to the receive conductors 602F and transmit conductors 602G, respectively of line 602D of set 602.

For purposes of description it is assumed that line 601E may be represented by line 1 of the multi-line set shown in FIGS. 1–5 and that transmit conductors 601F and receive conductors 601G are represented by transmit conductors 210C and receive conductors 211C of FIGS. 2 and 7.

The connections for the line termination circuit are the same as in the case of the ESC mode to program line 1 for back-to-back operation. Thus, programming plug 702 is also used to program line termination circuit 210 of line 1 for the back-to-back mode (B to B). However, the transmit leads 210C and the receive leads 211C of line 1 would be connected directly to the receive and transmit leads of a line of a second multi-line set (not shown in FIG. 7).

With reference to FIGS. 1 and 2, to make a call over line 1 to a party connected in back-to-back mode with a line of a remote multi-line set, the console subscriber seizes line 1 and presses ring key 174A, shown in FIG. 1, to generate a ringing tone. The tone is transmitted via the local line circuit 100 through transmit amplifier 147, contact 170c of seize relay 170 for line 1, through line termination circuit 210, to the line of the multi-line set connected to conductors 210C and 211C.

More specifically, the astable multivibrator 174 turns gate 137 on and off at a 10 Hz rate, thus connecting ground to the ring key 174A at a 10 Hz rate.

When the ringing key 174A is depressed, ground is connected over lead 174B as an input to the group oscillator 136 causing a 600 Hz signal from oscillator 136 gated at the 10 Hz rate as long as the ring key is depressed to be passed along conductor 136A to amplifier 147 via resistors 150 and 155. Accordingly, the line of the remote multi-line set connected via the back-to-back connections receives a non-priority ring. When the called subscriber answers, a talking path is established by the direct connections between the transmit and receive conductors of the lines of the two sets.

By employing the back-to-back connections, a conference can be set up between two or more multi-line sets without establishing a path through the switching center 600. With reference to FIG. 6, it is assumed that a call is established between line 602D of multi-line set 602 and line 601E of set 601. To include a third party, for example, a party on line 609A of set 609, the console subscriber of set 602 places line 602D on hold and seizes line 602E of set 602, and by back-to-back signalling, calls line 609A of set 609. When the party on 609A answers, lines 602E and 609A will be connected together in a normal call connection. The console subscriber of multi-line set 602 then depresses the conference pushbutton and a line seize pushbutton for line 602D and, in the manner described above for conference connections, lines 602D and 602E will be interconnected via associated conference relays. However, since line 602D is also connected directly to line 601E of multi-line set 601, line 601E will also be connected directly to line 609A of multi-line set 609, and the three subscribers on lines 602D, 601E and 609A will be interconnected by the conference connection of multi-line set 602, and a multi-party conference is established between the three multi-line sets 601, 602 and 609 without connection to the electronic switching center 600.

It should be understood that back-to-back connections of a multi-line set are not restricted to one line but may be used with up to four of the lines.

3. Local Multi-Line Mode

The local multi-line mode is essentially a party line type connection which permits a plurality of lines such as four lines, for example, from one or more other multi-line sets to be connected in parallel with a line of a parent multi-line set, for example line 1 of the multi-line set shown in FIGS. 1–5, for connection to an electronic switching center. The overall operation in this mode is similar to operation in the electronic switching center mode. However, provision has been made for origination and reception of calls by all lines which are interconnected by a multi-line network, such as network 211 shown in FIGS. 2 and 8.

The multi-line network 211 shown in FIG. 2 is connected in series with the lines incoming from the electronic switching center on conductor 210C and 211C, and the lines 210A and 211A which are connected to the local line circuit of the multi-line set. The multi-line network 211 is so connected by means of a socket 700 (FIG. 8) and a plug 701 shown in FIG. 7A. The programming of line termination circuit 210 for multi-line operations is shown in FIG. 8 along with the circuit details of the multi-line network 211, which is shown only in block form in FIG. 2.

Figure 8:
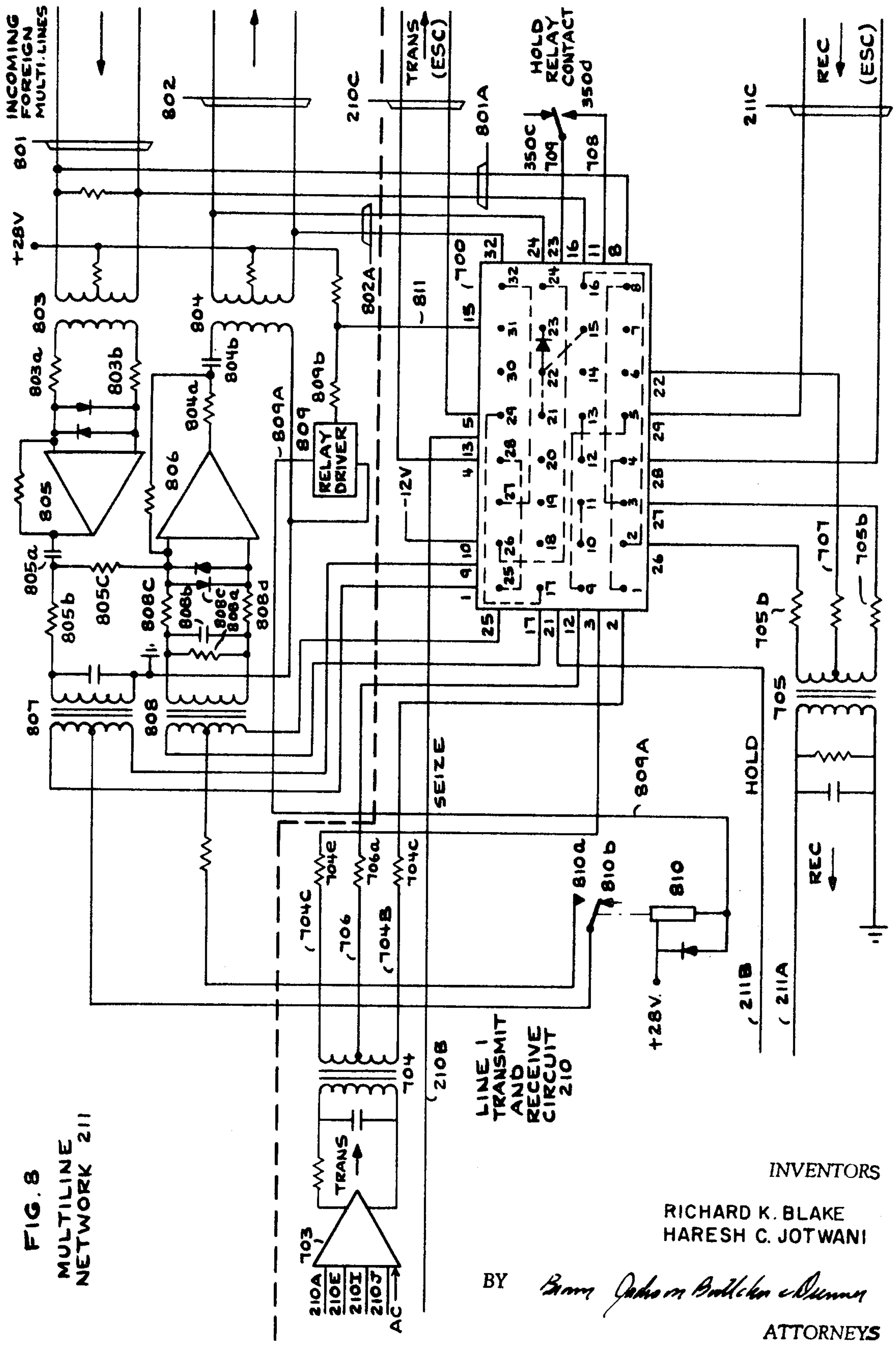
FIG. 8 is a circuit diagram of a line connected for operation in a local multi-line mode.

In the local multi-line mode, the connections and circuitry provided by the multi-line network 211 and termination circuit 210 provide the means whereby, when a subscriber of any one of the foreign lines or the local lines desires to make an outgoing call over conductors 210C and 211C of line 1 or goes off hook, a D.C. loop is established upon operation of a hold relay, such as relay 350 of line 1, which causes the multi-line relay 810, FIG. 8, to be operated. The presence of the D.C. loop is detected by the switching center. Similarly, when a call is being received by the local line via conductors 210C and 211C, a ringing signal for this call will also cause the four foreign lines to be rung. When any one of the five lines answers the call, the ringing will stop on all the lines and the seize lamps for all five lines will be lit.

Figure 7A:
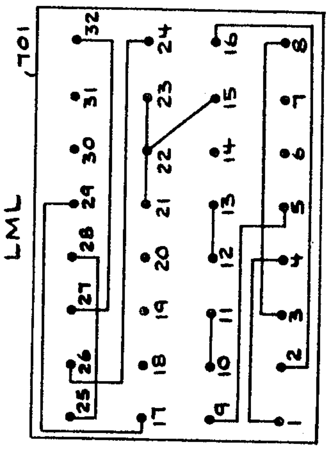

Line 1 is programmed for multi-line mode by inserting plug 701, shown in FIG. 7A, into socket 700 (FIG. 8). This connects the multi-line network 211 in series with line termination circuit 210.

Referring to FIG. 8, the receive conductor pair 211C of line 1, which are connected to the electronic switching center (not shown), terminate at pins 28 and 29 of terminal block 700 and are connected via terminals 25 and 17 of plug 701 to the primary winding of transformer 808. The secondary of transformer 808 is connected to the input of amplifier 806 through resistor 808c and 808d. The output of amplifier 806 is connected through resistor 804a and capacitor 804b to the primary winding of transformer 804. The secondary winding of transformer 804 is connected to conductors 802 which are in multiple to the receiving terminals of four foreign lines connected to line 1 through the multi-line network 211. The secondary of transformer 804 is also connected to pins 32 and 24 of socket 700 and is extended to conductor 211A for connection to the local line circuit 100, FIG. 1, of the multi-line set, via pins 26 and 27, resistors 705b and transformer 705.

The transmit path for the multi-line set can be traced from an input such as via lead 210A from the local line circuit 100 of the multi-line set through amplifier 703 to pins 2 and 3 of socket 700 via transformer 704 and resistors 704b and 704c. Pins 2 and 3 are connected via plug 701 to pins 16 and 8, respectively, and to the primary winding of transformer 803 in parallel with conductors 801 from the incoming foreign multi-lines. The secondary winding of transformer 803 is connected to amplifier 805 through resistors 803a and 803b. The output of amplifier 805 is connected via capacitor 805a, a resistor 805b and transformer 807 to pins 1 and 9 of socket 700, via plug 701 to pins 4 and 5, which are connected to the transmit conductors 210C which extend to an electronic switching center.

The remaining circuitry of the multi-line network 211 includes relay driver 809 and relay 810 which closes a D.C. supervision loop providing the switching center with an indication of the "on-hook" or "off-hook" status of the lines connected to line termination network 210.

Transformers 803, 804, 807 and 808 and amplifiers 805, 806 provide impedance matching for the lines incoming from the foreign multi-line sets and compensate for losses due to the insertion of the multi-line network in series with the transmission path. Transformers 803 and 804 are low impedance transformers so that loading effect is negligible whether one or four lines are connected in parallel. When connected in the multi-line mode, the four foreign lines use the network 210 of the local multi-line set for making and receiving calls.

In general, for incoming or outgoing calls, the logical sequence of operation is the same as for placing calls when connected in the ESC mode described above. The main differences will be pointed out by way of example with reference to FIGS. 1–5.

For purposes of illustration, it is assumed that an outgoing call is to be made over line 1 (FIGS. 1–5). Line 1 is seized by depressing line 1 seize pushbutton 183. Seize lamp 404A of line 1 is lit and seize relay 170 and hold relay 350 are operated. In addition, through contact 325e of pushbutton hold coil 325, a negative 12 volts is connected to lead 375 and, through diode 522, this negative voltage is applied to the input of a seize buffer 521 shown in FIG. 5. The negative 12 volts also appears at pin 13 of socket 700 over lead 210B (FIG. 8). Pin 13 is connected to pin 12 by plug 701 and this negative 12 volts is extended through resistor 706*a* over lead 706 and the secondary of transformer 704 to leads 704C, which are connected through resistors 704*c* and 704*e* to pins 2 and 3, respectively, of socket 700. Pins 2 and 3 are connected via plug 701 to pins 16 and 8 so that the negative potential also appears on lead pairs 801A and 801 and is applied to the seize buffers of all the foreign multi-lines connected to lead pair 801. The buffer circuits isolate the logic circuits associated with each line, from the electromechanical switching elements.

When the negative 12 volts is applied to the input of the seize buffers, including buffer 521 of line 1, a positive 28 volts is provided at the output of buffer 521 to lead 521A, which connects the output buffer 521 to an input of gate 403 (FIG. 4).

Seizure of line 1 causes hold relay 350 to operate and contact 350*d*, shown in FIG. 8, is closed closing a path between conductors 709 and 708 and causing relay 810 to be energized over a path from a negative 12 volt supply pins 10 and 11, contact 350*d*, pins 23 and 22, diode 709*a* of plug 701 (FIG. 7A), pin 15, conductor 811, relay driver 809, through a resistor 809*b* and lead 809A. When relay 810 operates, contact 810*a* is closed providing a D.C. supervision loop, from contact 810*a* of relay 810 through resistor 808*e* to the center tap of transformer 808, through half the primary winding of transformer 808 to terminal 25 of socket 700, pin 28 and to one of the conductors of cable pair 211C which extends to a switching center. The other half of the loop includes one of the transmit conductors 210C which extends to the switching center, connected to pin 5 and extended via plug 701, to pin 9, through half of the secondary of transformer 807 back to contact 810b of relay 810. The closure of this loop, detectable at the switching center, is indicative of an off-hook condition for one of the four lines connected in parallel with conductors 210C and 211C of line 1.

The negative 12 volts also appears on lead 707, FIG. 8, at pin 22 which is connected to pin 23 through diode 709*a* of plug 701 via contact 350*d* of hold relay 350 and pins 11 and 10. From lead 707, the negative voltage is extended to lead pair 802 via leads 705B connected to pins 26 and 27, pins 24 and 32, to the inputs of the hold buffers of the lines connected to lead pair 802.

The negative 12 volts is also applied to the input of hold buffer 520, FIG. 5, of line 1 via lead 211B and pins 21 and 22 of socket 700. When the negative 12 volts is applied to the input of a hold buffer, such as buffer 520 of line 1, a positive 28 volts is provided at the output of the buffer 520 to lead 520A which connects the output of hold buffer 520 to an input of gates 402 and 403 (FIG. 4). When the outputs of seize buffer 521 and hold buffer 520 are both positive, gates 402 and 403 are enabled and logic 0 is provided at the outputs of gates 402 and 403 which are connected to input gates 361 and 363 of the visual signal control gates to inhibit these gates whenever the local line circuit 100 or one of the foreign lines of the multi-line connection is seized. Gate 402, when enabled, provides a logic 0 at its output and via lead 367A, disables gate 368 which, in turn, enables lamp driver 401 and lights lamp 404A to indicate the local line 100 is seized. In a similar manner, the hold and seize buffers associated with the foreign multi-lines would operate similar logic gates to cause seize lamps for the foreign multi-lines to be lit whether or not the party on the particular line is taking part in the conversation. Any or all the parties connected together by multi-line network 211 can go off-hook and take part in the conversation.

The call is terminated when all parties go back on-hook. The lines, such as line 1, can also be released by depressing the release pushbutton 182 for line 1 causing a positive 28 volts to be applied through lamp 320 to lead 375 and to the input of seize buffer 521. The positive 28 volts is passed, via conductor 210B, pins 13 and 12, the secondary of transformer 704, pins 2 and 3, 8 and 16, to conductors 801 and thence to the seize buffers of all the foreign multi-lines connected to the multi-line network 211.

When line 1 is released, contact 350d of hold relay 350 is opened and the path which connected the negative 12-volt supply to the inputs of hold buffers including buffer 520 is opened and the output of hold buffer 520 becomes a logic 0. Gates 403 and 402 are disabled, lamp driver 401 is disabled as gate 368 changes state, and lamp 404A is extinguished. Similarly, the seize lamps for the foreign multi-lines are extinguished. The rest of the disconnect operation such as release of hold and seize relays, is the same as described above for operation of release pushbutton 182.

For incoming priority or non-priority calls, the lamps will flash on the consoles such as console 188 for line 1, for all the lines connected to the multi-line network and the audible ring will be generated at each console by the acoustic transducer such as transducer 175 of console 188. As soon as a called line is seized by one of the subscribers, the audible ringing on all the lines, and the flashing of the seize lamps for all the lines will cease.

Irrespective of the mode in which any of the four lines of the multi-line set are connected, a conference connection can be established between all or any of the lines in the manner described above.

The sequence of operations for a call originated by one of the four foreign lines is similar to that described for a call originating at the local multi-line set.

4. Foreign Multi-Line Mode

Referring to FIG. 6, in the foreign multi-line mode, a line, such as line 601D of multi-line set 601, is connected by way of a multi-line network, such as network 611, in parallel with a local line 602B of multi-line set 602 which includes the network 611, and in parallel with lines from other multi-line sets.

Figure 9:
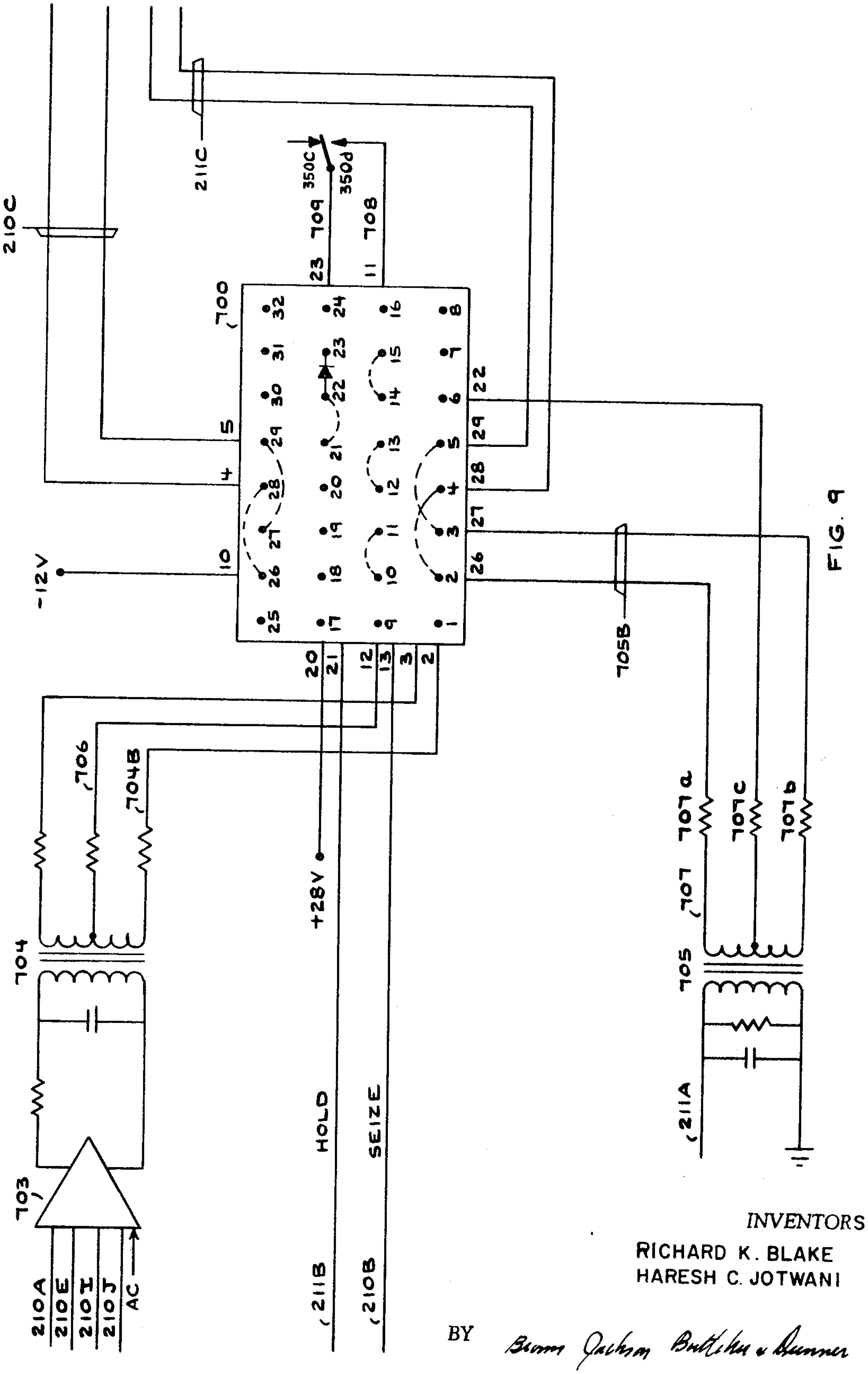
FIG. 9 is a circuit diagram of a line connected for operation in a foreign multi-line mode.

The multi-line network, such as network 611, has been described in the foregoing with reference to FIG. 8. The connections for a foreign multi-line are shown in FIG. 9 wherein it is assumed that the line 601D shown connected in a foreign multi-line mode is line 1 of the multi-line set shown in FIGS. 1–5. The outgoing leads 210C and 211C are connected to a multi-line network of line 611 of subset 602 shown in FIG. 6. The incoming transmit and receive conductors 210C and 211C terminate at pins 4–5 and 28–29, respectively, of socket 700. Receive conductors 211C are extended to the local line circuit 100 of the multi-line set of FIGS. 1–5 via conductor 211A through transformer 705, conductors 705B, pins 26 and 27, which are connected to pins 28 and 29, respectively, by plug 702, shown in FIG. 7B. This plug is also used for making the programmed connections in the ESC mode. When the plug is rotated 180 degrees, the proper strapping for the foreign multi-line configuration is provided. The output of the local line circuit 100 over conductor 210A is conducted through amplifier 703, transformer 704 to pins 2 and 3, which, in turn, are connected to pins 4 and 5 via plug 702, and to conductors 210C. Conductors 211B and 210B connect the line termination circuit 210 to the hold and seize buffers 520 and 521 of line 1, to conduct a negative 12 volts to the inputs of these buffers in response to seizure of the local line or one of the foreign multi-lines connected to the local line circuit of set 602 through the multi-line network 611.

The sequence of operation for an outgoing or incoming call over line 1 is the same as in the case of the local line connected in the local multi-line mode illustrated above and the foreign multi-lines use the multi-line network 64 of the local multi-line to provide D.C. supervision and connection to the switching center for making and receiving calls.

FURTHER DETAILED DESCRIPTION OF TONE DETECTOR CIRCUITRY

Figure 11:
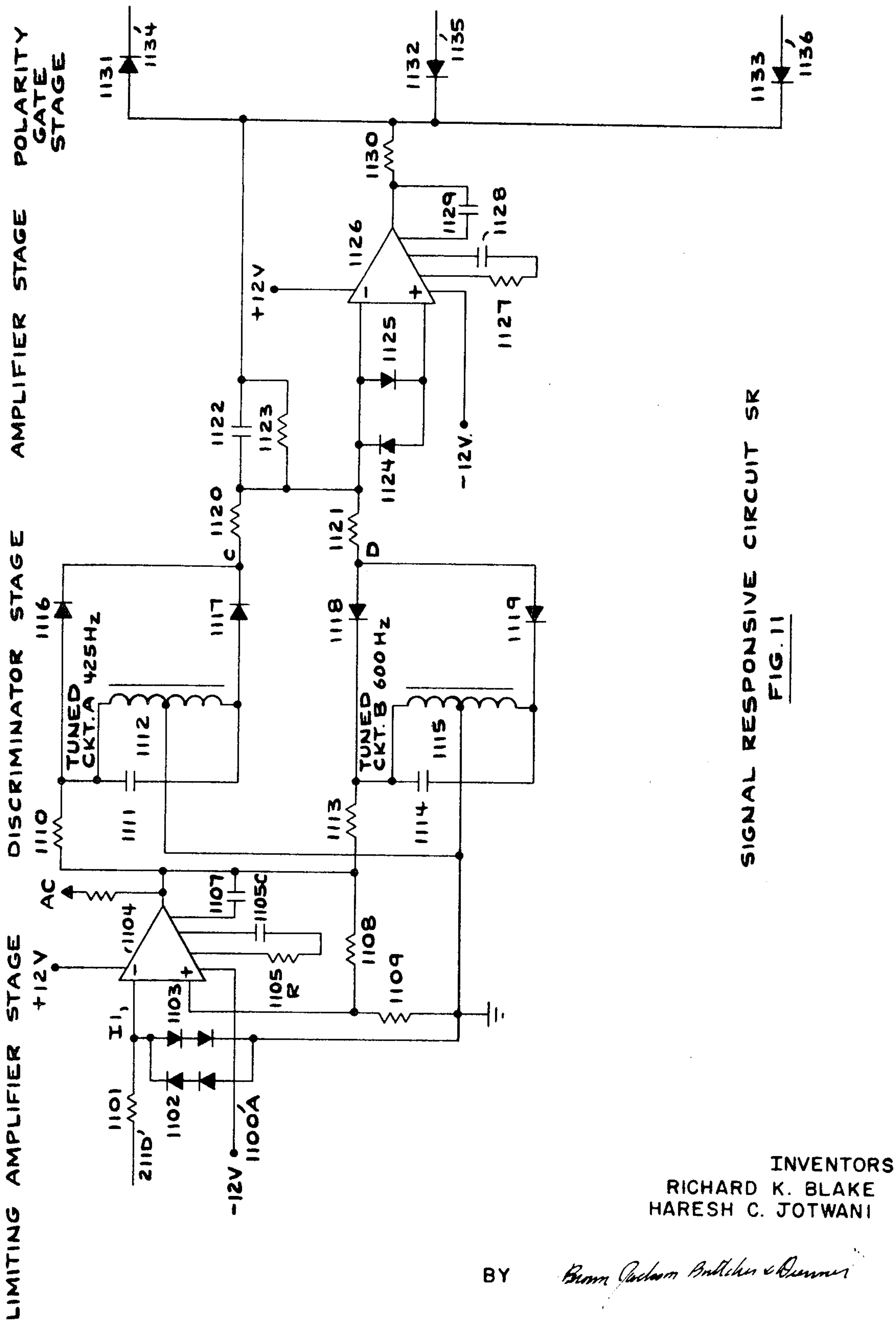
FIGS. 11 and 12 placed side by side, left to right, provide a detailed schematic of the tone detector.
Figure 12:
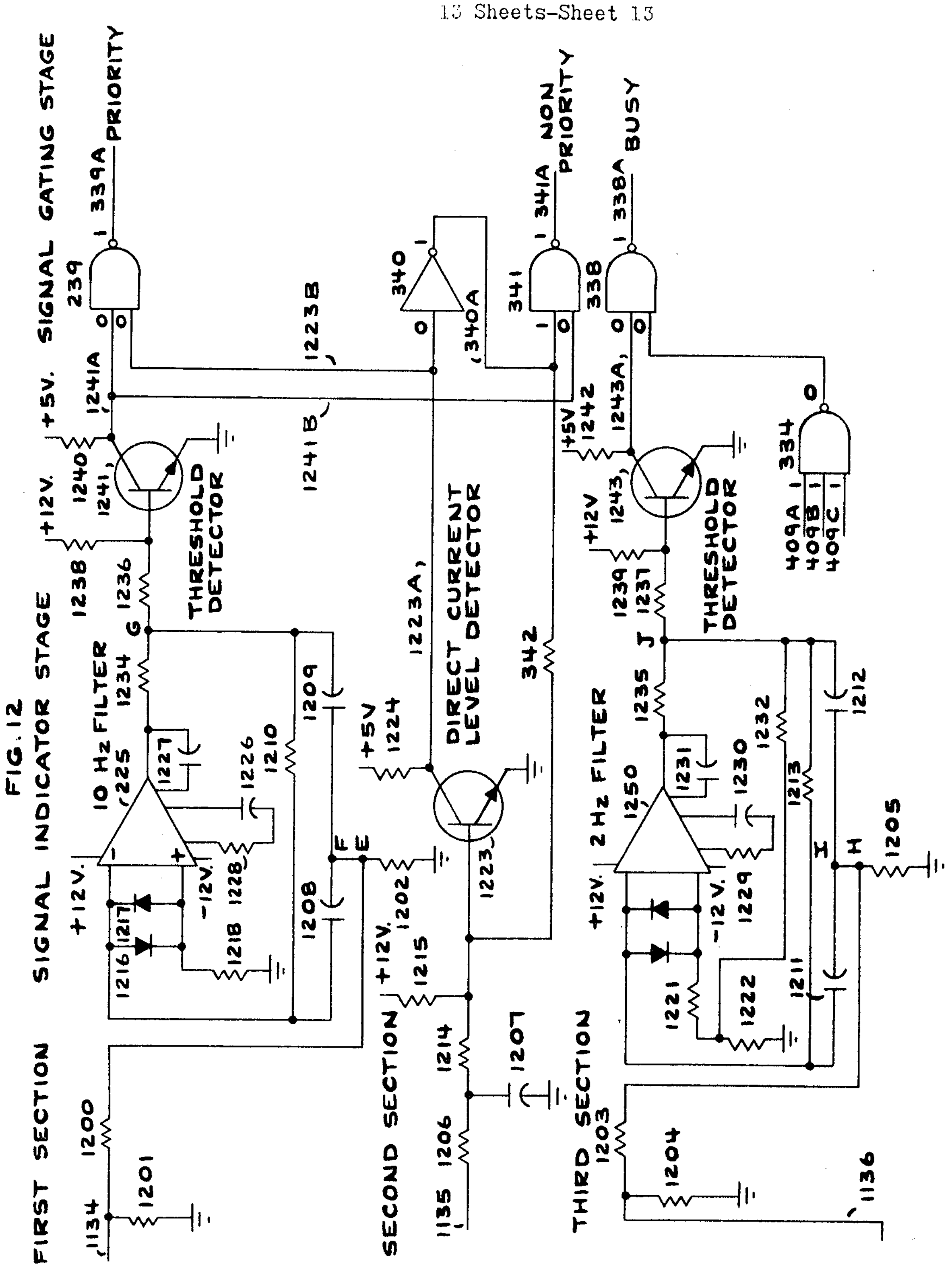

With reference to FIGS. 11 and 12, the novel tone detector circuit 107 of FIGS. 1A, 1B and 3 is shown in more detail, the input thereto being over lead 211D, there being a tone detector circuit for each line. The logic outputs of the tone detector circuit are connected to logic control circuitry which provides appropriate audible and visual signals and control. Incoming signals are fed through resistor 1101 to the inverting input of operational amplifier 1104. Three different types of signals are transmitted from the ESC switchboard over such input to amplifier 1104, these three signals comprising the priority ring signal, the non-priority ring signal, and the busy tone signal.

Each input signal on conductor 211D is fed to amplifier 1104. Amplifier 1104 (also amplifiers 1121, 1225 and 1250) may be a well known integrated circuit operational amplifier of the A709 type. Amplifier 1104 is connected in circuit as a limiting amplifier which in operation performs the function of limiting and converting the sine wave signals incoming on conductor 211D to a square wave which has a constant amplitude. Capacitor 1105C and resistor 1105R, along with capacitor 1107, provide the necessary frequency compensation and amplifier stabilization for amplifier 1104. The non-inverting input of amplifier 1104 is connected via resistor 1109 to ground, and +12 volts and −12 volt bias potentials are connected as power to the amplifier 1104. Diodes 1102 and 1103 are connected in circuit across the inverting and non-inverting inputs of amplifier 1104 to minimize the possibility of damage to the amplifier components by voltage spikes. Similar networks and diodes and power connections are associated with amplifiers 1126, 1225, and 1250. The limiting characteristic of amplifier 1104 acts as an initial guard against voice and noise signals.

The square wave signal current output from amplifier 1104 is applied over resistors 1110 and 1113 to the discriminator stage which includes the tuned circuit A and associated diodes 1116 and 1117 and the tuned circuit B and associated diodes 1118 and 1119. The first tuned circuit A, consisting of parallel connected capacitor 1111 and inductor 1112, is tuned at 425 Hz, and the second tuned circuit, consisting of parallel connected capacitor 1114 and inductor 1115, is tuned at 600 Hz. The discriminator stage provides a further guard against voice and noise signals.

If the incoming signal is a priority signal, both 600 Hz and 425 Hz alternately will be present for 50 ms intervals each (i.e. frequency shifted at a 10 Hz rate) and a voltage will appear alternately at points C and D. The priority signal is on one second and off one second. If the incoming signal is a nonpriority signal only the 600 Hz will be present and a corresponding voltage will appear at point D during alternate intervals of 50 ms (i.e. at a 10 Hz rate). The non-priority signal is on 2 seconds and off four seconds. If a busy signal is received, 425 Hz repeatedly will be present for 250 ms and off for 250 ms thus being applied at a 2 Hz rate and a corresponding voltage during alternate intervals of one-fourth second will be present at point C.

a. Priority Signals

During receipt of the priority signal, the resultant signal output of the tuned circuit A is rectified by diodes 1116 and 1117 and appears at point C, and the resultant signal output of tuned circuit B is rectified by diodes 1118 and 1119 and appears at point D.

The positive going voltage output from the tuned circuit A (corresponding to 425 Hz) and diodes 1116 and 1117 at point C is applied over resistor 1120 to the inverting input of amplifier 1126, and the negative going output voltage of the tuned circuit B (600 Hz) and diodes 1118 and 1119 at point D is applied over resistor 1121 to the same input of amplifier 1126.

The waveform output of the amplifier 126 (inverted relative to the inputs) is fed via resistor 1130 to diode gates 1131, 1132, 1133 of the polarity gate stage. Such waveform in the case of a priority signal input varies between +10 volts to −10 volts at a rate of 10 Hz (corresponding to alternate 600 Hz and 425 Hz signals), the +10-volt portion corresponding to the 600 Hz input and the −10-volt portion to the 425 Hz input. The nature of the waveform output for the nonpriority and busy signals would be understood.

A feedback loop including capacitor 1122 is connected to the input of amplifier 1126 to provide low pass filtering.

b. Nonpriority Signal

In the case of an incoming nonpriority call, the ringing signal input to the set over conductor 211D contains only a 600 Hz signal, and therefore only tuned circuit B and diodes 1118 and 1119 will provide a voltage signal (negative-going) at the input of the discriminator 1126. In the case of a nonpriority signal (600 Hz only) the output of amplifier 1126 comprises a waveform which varies between 0 volts and approximately +10 volts at a 10 Hz rate during alternate 50 ms intervals.

c. Busy Tone Signal

In the event a busy tone signal is received over the input circuit 211D, only 425 Hz is present, and only tuned circuit A and diodes 1116 and 1117 will provide a signal voltage (positive going) to the input of discriminator amplifier 1126, which in turn provides a negative signal voltage output to the signal indicator circuit. In the case of busy tone (425 Hz only), the output of the discriminator amplifier 1126 varies between 0 volts and approximately −10 volts at the 2 Hz rate.

SIGNAL INDICATOR CIRCUIT

The signal indicator circuit comprises three sections which are selectively operative to response to the receipt of signal s over the polarity gate stage in a manner to be described.

Normally, with no signals input over lead 1134 to the first section, NPN transistor 1241 therein will be found conducting with +12 volts through resistor 1238 connected to the base, +5 volts through resistor 1240 connected to the collector, and ground connected to the emitter thereof; and lead 1241A will be at essentially gound potential, comprising logic 0.

Normally, with no signals input over lead 1135 to the second section, NPN transistor 1223 will be found conducting with +12 volts through resistor 1215 connected to the base, +5 volts through resistor 1224 connected to the collector, and ground connected to the emitter thereof; and lead 1223A will be at essentially ground potential, comprising logic 0.

Normally, with no signals input over lead 1136 to the third section, NPN transistor 1243 will be found conducting with +12 volts through resistor 1239 connected to the base, +5 volts through resistor 1242 connected to the collector, and ground connected to the emitter thereof; and lead 1243A will be at essentially ground potential, comprising logic 0.

Operation of First Section

Assume that the 10 Hz signal varying between 0 volts and +10 volts corresponding to the 600 Hz applications is input over lead 1234 to the first section of the signal indicator circuit (as a result of either priority or non-priority signals). This signal passes over high resistance 1200, point E and low resistance 1202 of a voltage divider to ground. Point E is connected to point F of a 10 Hz filter as shown, consisting of operational amplifier 1225 and its associated circuitry, output resistance 1234, and a bridged T circuit comprising resistance 1210 and capacitances 1208 and 1209 connected between the output and the inverting input, providing negative feedback. Relatively low resistance 1201 insures adequate current flow through diode 1131 of FIG. 11.

The Q of the 10 Hz filter is critically adjusted to introduce a certain delay which guards against noise and speech signals from appearing at the output of this filter.

The output of amplifier 1225 through resistance 1234 at point G (i.e. the output of the 10 Hz filter which is a 20-volt peak to peak sine wave between +10 volts and −10 volts) is connected over resistance 1236 to the base of transistor 1241 which acts as a threshold detector. As the signal to the base of transistor 1241 as a result thereof decreases below negative 7 volts, the base is reverse biased and transistor 1241 turns off and remains off during the interval that this incoming signal to the base is more negative than −7 volts. During this period, +5 volts (logic 1) obtains on lead 1241A.

The waveform at point G, which is applied to the base of transistor 1241 through resistance 1236, is sinusoidal whereas the waveform which occurs on lead 1241A is a positive going square wave. As noise or speech signals will not cause the signal at the base of transistor 241 to go more negative than −7 volts, transistor 1241 will not change state due to noise or speech signals. (Actually, the limiting amplifier 1104 and the discriminator stage have provided initial guard circuits against noise or speech signals, but the 10 Hz filter and threshold detector of the first section and 2 Hz filter and threshold detector of the third section act as further guards.)

Operation of the Second Section

Assume that a signal varying between 0 volts and −10 volts is input over lead 1135 to the second section of the signal indicator circuit (i.e. a 10 Hz signal as a result of the 425 Hz component of the priority signal; or the 425 Hz busy signal, the operation as a result of the busy signal being incidental.)

As the signal varying between 0 volts and −10 volts is received over conductor 1135, capacitor 1207 quickly charges to negative potential and remains at negative potential during the one second on of the priority signal or during all of the busy signal.

As capacitor 1207 charges to negative potential, this negative potential via resistor 1214 to the base of transistor 1223 turns transistor 1223 off, whereby the collector thereof and lead 1223A is placed at approximately +5 volts potential constituting logic 1.

During the 1 second off of the priority signal or when busy tone ceases, capacitor 1207 discharges over resistors 1214 and 1215 and becomes positively charged whereby transistor 1223 is again operated.

Operation of the Third Section

Assume that a signal varying between 0 volts and −10 volts is input over lead 1136 to the third section of the signal indicator circuit (i.e. a 10 Hz signal as a result of the 425 Hz component of the priority signal which is incidental; or the 2 Hz busy signal). This signal passes over high resistance 1203, point H and low resistance 1205 of a voltage divider to ground. Point H is connected to point I of a 2 Hz filter as shown, consisting of operational amplifier 1250 and its associated circuitry, output resistance 1235, and a bridged T circuit comprising resistance 1213 and capacitances 1211 and 1212 connected between the output and the inverting input, providing negative feedback. Resistor 1232 connected between the output of point J to the common point of resistors 1221 and 1222 provides positive feedback, allowing capacitors 1211 and 1212 to be of smaller value for convenience and economy. Relative low resistance 1204 insures adequate current flow through diode 1133 of FIG. 11.

The Q of the 2 Hz filter is critically adjusted to introduce a certain delay which prevents noise and speech signals from appearing at the output of the filter. Also the 2 Hz filter blocks the incidental 10 Hz signal.

The operation of transistor 1243 by the 2 Hz filter is similar to the operation of transistor 1241 by the 10 Hz filter already described.

SIGNAL GATING CIRCUIT

Referring now to the signal gating circuit of FIG. 12, with transistors 1241, 1223, and 1243 normally conducting, essentially ground potential (logic 0) obtains on leads 1241A (and 1241B), 1223A (and 1223B), and 1243A.

Referring to NAND gate 339, logic 0 on lead 1241A and logic 0 on lead 1223B will be input thereto whereby the output on lead 339A will be logic 1 to succeeding logic control circuitry as a signal thereto that no priority signal should issue.

Referring to inverter 340, logic 0 input thereto on lead 1223A results in logic 1 (positive potential) output therefrom on lead 340A. This positive potential through resistance 342 effects a snap action of transistor 1223 upon turn on. This logic 1 obtains as an input to NAND gate 341.

Referring to NAND gate 341, logic 1 on lead 340A and logic 0 on lead 1241B will be input thereto whereby the output on lead 341A will be logic 1 to succeeding logic circuitry as a signal thereto that no priority signal should issue.

Referring to NAND gate 338, logic 0 is normally input thereto on lead 1243A. Also if line 1 is not in conference with any other of the lines 2, 3, 4, the output of NAND gate 334 is logic 0 which appears as another logic 0 input to NAND gate 338 whereby the output on lead 338A to succeeding control circuitry is logic 1.

In preparation for what follows it should be observed that if transistor 1223 is on, logic 1 is input to NAND gate 341 preparing for operation thereof as a nonpriority signal is received; whereas if transistor 1223 is off, logic 1 is input to NAND gate 339 preparing for operation thereof as a priority signal is received.

Priority Signal

Assume that a priority signal (600 Hz and 425 Hz shifted at the 10 Hz rate) is received. The 425 Hz component results in the turning off of transistor 1223, which in turn results in logic 1 to NAND gate 339 preparing this gate, and logic 0 (essentially ground) on lead 340A to NAND gate 341 keeping this gate inhibited. Ground placed on lead 340A through resistor 342 effects a snap action of transistor 1223 on turn off. As each 600 Hz component is received, transistor 1241 is turned off, resulting in logic 1 on lead 1241A to NAND gate 339 and logic 1 on lead 1241B to NAND gate 341. With both inputs of NAND gate 339 at logic 1, the output on lead 339A becomes logic 0 as a signal to logic control circuitry to issue distinctive aduible and visual signals indicative of an incoming priority call. With one input of NAND gate 341 at logic 0 and another at logic 1, no change in the output of gate 341 results.

The diode 1133 prevents signals related to the 600 Hz component of the 10 Hz priority signal from entering the third section and the 2 Hz filter of the third section prevents the signals related to the 425 Hz component of the 10 Hz priority signal from affecting transistor 1243.

Nonpriority Signal

Assume that a nonpriority signal (600 Hz turned on and off at 10 Hz rate) is received. With no 425 Hz component present, transistor 1223 remains conducting whereby logic 0 on conductor 1223B to NAND gate 339 keeps this gate inhibited, and logic 1 on lead 340A to NAND gate 341 prepares this gate. As each burst of the 600 Hz component is received transistor 1241 is turned off, resulting in logic 1 on lead 1241A to NAND gate 339 which does not respond, and logic 1 on lead 1241B to NAND gate 341 which does respond, with both inputs of NAND 341 at logic 1. The output of NAND gate 341 on lead 341A becomes logic 0 as a signal to succeeding logic control circuitry to issue distinctive audible and visual signals indicative of an incoming nonpriority call.

Diode 1133 prevents signals related to the 600 Hz bursts from entering the third section.

Busy Signal

Assume that the busy signal (425 Hz turned on and off at the 2 Hz rate) is received. Transistor 1243 becomes turned off at the reception of each 425 Hz application, placing logic 1 on lead 1243A to NAND gate 338. If line 1 is in conference with one or more of the other lines 2, 3, 4, one or more of the inputs to NAND gate 334 will be at logic 0 whereby the output of NAND gate 334 will be at logic 1 which appears as an input to NAND gate 338. Coincidence between this conference condition and the arrival of the busy signal from the electronic switching center results in logic 1 at both inputs of NAND gate 338 whereby the output therefrom on lead 338A is logic 0 to succeeding control circuitry turning transistor 321 (FIG. 3) off deenergizing hold coil 325, releasing line 1; also resetting the latch comprising gates 344 and 345.

Transistor 1223 in the second section incidentally follows the 425 Hz applications but, as no 600 Hz applications are present, NAND gates 339 and 341 do not respond.

The novel circuit set forth herein is thus operative to detect and signal the occurrence of priority, non-priority and busy tone signals at a telephone set, guarding against false signaling as a result of receipt of speech or noise.

Additional and Summary Observations are as Follows:

By the use of program plugs shown in FIGS. 7A and 7B, terminations for lines 1, 2, 3, and 4 can be changeably programmed for diverse operation without soldering and unsoldering.

Direct current signaling between interconnected multi-line instruments is accomplished by providing one direct current signaling path over the transmit pair of the four-transmission path, and another direct current signaling path over the receive pair of the four-wire transmission path.

By means of the resistor 805C placed in the multi-line network of FIG. 8, the parties on LML–FML extensions are enabled to hear each other.

Leads designated "AC" in FIGS. 2, 3, and 11 illustrate optional connections to an additional card, now shown, whereby alternating current signaling over lines 1, 2, 3, and 4 may be implemented.

Referring to FIG. 2 it should be understood that multi-line network 211, by means of the program plug shown in FIG. 7A, can be associated with any of the lines 1–4.

We claim:

1. A multi-line telephone set including a local line circuit having transmit and receive paths, a plurality of line termination circuits for providing transmit and receive paths for each of a plurality of lines connected to said termination circuits, seize means operatively associated with a first one of said line termination circuits for connecting the transmit and receive paths of a first one of said lines to the transmit and receive paths of said local line circuit, hold means associated with said first line termination circuit including hold switch means operable when enabled to establish a D.C. supervision loop for said first line and a hold latch flip flop, said hold latch flip flop being set by said seize means to provide an enabling signal for said hold switch means in response to operation of said seize means to connect the transmit and receive paths of said first line to the transmit and receive paths of said local line circuit, means in said multi-line telephone set for controlling said seize means to effect the connection of the transmit and receive paths of a second one of said lines to the transmit and receive paths of said local line circuit and to simultaneously disconnect the transmit and receive paths of said first line from the transmit and receive paths of said local line circuit without interrupting the D.C. supervision loop established for said first line whereby said first line is automatically placed in a hold condition, and release means operable to provide a signal for resetting said hold latch flip flop to disable said hold switch means thereby removing the hold condition from said first line whereby unintentional release of said first line cannot occur.

2. A four-wire multi-line telephone set including a local line circuit having transmit and receive paths, a plurality of four-wire line termination circuits for providing separate transmit and receive paths for each of a plurality of four-wire lines connected to said termination circuits, seize means operatively associated with said first line termination circuit for seizing a first one of said lines including connect means for connecting the transmit and receive paths of said first line to the transmit and receive paths of said local line circuit, hold means associated with said first line termination circuit including hold switch means operable when enabled to establish a D.C. supervision loop for said first line and a hold latch flip flop, said hold latch flip flop being set by said seize means to provide an enabling signal for said hold switch means in response to operation of said seize means to seize said first line, means in said multi-line telephone set for controlling said seize means to connect the transmit and receive paths of a second one of said lines to said local line circuit and to simultaneously disconnect the transmit and receive paths of said first line from said local line circuit without disabling the hold switch means for said first line whereby said first line is automatically placed in a hold condition, and release means operable to provide a signal for resetting said hold latch flip flop to disable said hold switch means thereby removing the hold condition from said first line whereby unintentional release of said first line cannot occur.

3. A four-wire multi-line telephone set including a local line circuit having transmit and receive paths, a plurality of four-wire line termination circuits for providing separate transmit and receive paths for each of a plurality of four-wire lines connected to said termination circuits, seize means for seizing a first one of said lines including connect means for connecting the transmit and receive paths of said first line to the transmit and receive paths of said local line circuit, control means in said multi-line set for controlling said seize means to connect the transmit and receive paths of a second one of said termination circuits to said local line circuit and to simultaneously place said first line in a hold condition, conference connect means including a plurality of conference relays operable when energized for individually connecting the transmit and receive paths of each of said lines to the transmit and receive paths of the other of said lines, and conference selection means including a plurality of logic gates controlled by said seize means and said control means for energizing a select one of said conference relays to connect the transmit and receive paths of said first and second lines in a local conference circuit connection.

4. A multi-line telephone set as set forth in claim 3 which includes conference hold means operable to place said first and second lines on hold while the transmit and receive paths of said lines remain connected together in a local conference circuit.

5. A multi-line telephone set as set forth in claim 4 which further includes further seize means for seizing third and fourth ones of said four-wire lines and for controlling a further plurality of logic gates of said conference selection means to energize a select other one of said conference relays for connecting the transmit and receive paths of said third and fourth four-wire lines in a further local conference circuit connection independent of said connection between said first and said second lines.

6. A multi-line telephone set as set forth in claim 5 which further includes release means for releasing said conference connections simultaneously.

7. A multi-line telephone set as set forth in claim 5 which further includes means for breaking the conference connections between one of said pair of lines without affecting the conference connection between the other pair of lines.

8. A four-wire multi-line telephone set including a local line circuit having transmit and receive paths, a plurality of four-wire line termination circuits for providing separate transmit and receive paths for each of a plurality of four-wire lines connected to said line termination circuits, seize means for seizing a first one of said lines including connect means for connecting the transmit and receive paths of said first line to the transmit and receive paths of said local line circuit, a coil and a transistor enabled by said seize means to provide a holding path for said coil to operate said connect means, means in said multi-line telephone set controlling said seize means to connect the transmit and receive paths of a second one of said termination circuits to said local line circuit and to simultaneously place said first line in a hold condition, conference selection means and conference connect means responsive to said conference selection means to connect the transmit and receive paths of said first and second lines in a local conference circuit connection and release means including a signal detecting circuit for causing said transistor to be disabled upon detection of a signal by said signal detecting circuit whereby the hold path for said coil is opened and said connect means is restored.

9. A multi-line telephone set as set forth in claim 8 in which said seize means includes seize logic circuits that are set whenever said first line is seized, said release means being connected to said seize logic circuits for resetting said seize logic circuits upon detection of said signal by said signal detecting circuit whereby the conference circuit connection between said first and second lines is opened.

10. A four-wire multi-line telephone set including a local line circuit having transmit and receive paths, a plurality of four-wire line termination circuits for providing separate transmit and receive paths for each of a plurality of four-wire lines connected to said termination circuits, a first one of said lines being connected to a switching center, and the line termination circuit for said first line including means for providing an indication of the on-hook or off-hook status of said first line, seize means for seizing said first line including connect means for connecting the transmit and receive path of said first line to the transmit and receive path of said local line circuit, means in said multi-line telephone set controlling said seize means to connect the transmit and receive paths of a second one of said line termination circuits to said local line circuit and simultaneously place said first line in a hold condition, conference selection means and conference connect means responsive to said conference selection means to connect the transmit and receive paths of said first and second lines in a local conference circuit connection, and means responsive to the receipt of a signal tone from said switching center via said first line for releasing the conference circuit in which said first line is connected whenever an on-hook status is indicated for said first line.

11. A multi-line telephone set as set forth in claim 3 wherein the line termination circuits for said first and second lines include separate summing amplifier means serially connected in the transmit paths of said first and second four-wire lines and in which said plurality of conference relays include a first conference relay for individually connecting the receive path of said first line to an input of the summing amplifier connected in the transmit path of said second four-wire line, and a second conference relay for individually connecting the receive path of said second line to an input of the summing amplifier connected in the transmit path of said first four-wire line.

12. A four-wire multi-line telephone set for sending and receiving priority and non-priority calls; said telephone set comprising a local line circuit having transmit and receive paths; a plurality of line termination circuits for providing separate transmit and receive paths for each of a plurality of four-wire lines connected to said termination circuits; detect means for detecting a signal indicative of the receipt of a call incoming over one of said lines including means for distinguishing between an incoming priority call signal and an incoming non-priority call signal; indicator means for providing a first indication whenever a priority call is being received and a second indication whenever a non-priority call is being received; and seize means for seizing said line including means for connecting the transmit and receive paths of said one line to the transmit and receive paths of said local line circuit.

13. A multi-line telephone set as set forth in claim 12 which includes hold means for providing an indication of the on-hook or off-hook status of said line and for causing said call signal to be inhibited when said line is seized.

14. A multi-line telephone set as set forth in claim 12 in which said indicator means includes an acoustic transducer and means for driving said transducer at a first rate whenever a priority call is being received and at a second rate whenever a non-priority call is being received.

15. A multi-line telephone set as set forth in claim 12 in which said indicator means includes a lamp and means for driving said lamp to flash at a first rate whenever a priority call is being received and at a second rate whenever a non-priority call is being received.

16. A multi-line telephone set as set forth in claim 15 in which said driving means includes a latch circuit connected to said detect means said latch circuit being latched whenever a call signal is detected by said detect means, and a gate circuit connected to said latch circuit for gating signals of a first frequency to said lamp whenever said latch circuit is latched and means for resetting said latch circuit after a predetermined time after said call signal ceases.

17. A four-wire multi-line telephone set for sending and receiving priority and non-priority calls; said telephone set comprising a local line circuit having transmit and receive paths; a plurality of line termination circuits for providing separate transmit and receive paths for each of a plurality of four-wire lines connected to said termination circuits; means for placing one of said lines in a hold condition; detect means for detecting the receipt of an incoming priority call over said one line; and indicator means for providing an indication that said incoming priority call is being received over said one line.

18. A four-wire multi-line telephone set for sending and receiving priority and non-priority calls; said telephone set comprising a local line circuit having transmit and receive paths; a plurality of line termination circuits for providing separate transmit and receive paths for each of a plurality of four-wire lines connected to said termination circuits; means for providing an indication that a non-priority call is being received over one of said lines; means for providing an audible indication that said non-priority call is being received by said set; and priority indicating means including means for providing a second visual indication and means for modifying said first audible indication whenever a priority call is received over one of said other lines while said non-priority call is being received over said one line.

19. A four-wire multi-line telephone set for sending and receiving priority and non-priority calls; said telephone set comprising; a local line circuit having transmit and receive paths, a plurality of four-wire line termination circuits for providing separate transmit and receive paths for each of a plurality of four-wire lines connected to said termination circuits; detect means for detecting the receipt of an incoming call over a first one of said lines; indicator means for providing an indication that said incoming call is being received over said first line; seize means for seizing said first line including connect means for connecting the transmit and receive paths of said first line to the transmit and receive paths of said local line circuit; means in said multi-line set for controlling said seize means to connect the transmit and receive paths of a second one of said termination circuits to said local line circuit and to simultaneously place said first line in a hold condition; means for overriding said hold condition whereby said first line becomes connected to said local line circuit while said second line remains connected to said local line circuit; conference selection means and means responsive to said conference selection means to connect the transmit and receive paths of said first and second lines in a local conference circuit connection; conference hold means for placing said first and second lines on hold, whereby said first and second lines become disconnected from said local line circuit and remain connected in a local conference connection; and further seize means for seizing a third one of said lines including further connect means for connecting the transmit and receive paths of said third line to the transmit and receive paths of said local line circuit.

20. A multi-line set as claimed in claim 19 which includes means for releasing said first and second lines from said local conference connection independent of the connection of said third line.

21. A four-wire multi-line telephone set including a local line circuit having transmit and receive paths, a plurality of four-wire line termination circuits for providing separate transmit paths for each of a plurality of four-wire lines connected to said termination circuits, means for seizing one of said lines including connect means for connecting the transmit and receive paths of said one four-wire line to the transmit and receive paths of said local line circuit, short circuit means for providing a short circuit across a portion of the transmit path of said local line circuit, control means for controlling said short circuit means removing said short circuit to permit transmission of speech over said local line circuit and said line, means for generating multi-frequency signals, and means responsive to said multi-frequency signals for inhibiting the operation of said control means during generation of said multi-frequency signals.

22. A four-wire multi-line telephone set including a local line circuit having transmit and receive paths, a plurality of line termination circuits each providing separate transmit and receive paths for a four-wire line connected thereto, and means for selectively connecting the transmit and receive paths of said termination circuits to the transmit and receive paths of said local line circuit, each line termination circuit including a socket having a plurality of terminals and a plug including a plurality of contact pins interconnected in sets by conductors, said contact pins being located in preselected positions on said plug whereby the interconnected contact pins interconnect a first predetermined set of terminals of said socket to provide a first mode of operation for said line termination circuit whenever said plug is removably inserted into said socket in a first position and the interconnected contact pins interconnect a second predetermined set of terminals of said socket to provide a second mode of operation for said line termination circuit whenever said plug is removably inserted into said socket in a second position.

23. In a four-wire, multi-line telephone system including a plurality of four-wire telephone sets, each having a local line circuit and separate transmit and receive paths, a four-wire line termination circuit for connecting the four-wire transmit and receive paths of one of said telephone sets to a switching center, switching means associated with said one telephone set including connection means for selectively connecting the transmit and receive paths of said one telephone set to the transmit and receive paths of said four-wire line termination circuit, a multi-line network connected to said four-wire line termination circuit for establishing a party-line connection including said one four-wire telephone set and a pre-selected group of said plurality of four-wire telephone sets, including means for introducing cross-talk between the transmit and receive paths of said four-wire telephone sets which are connected to said four-wire termination circuit, said multi-line network being connected to extend ringing signals received from said switching center by said four-wire line termination circuit to each of said telephone sets of said preselected group.

24. A system as set forth in claim 23 which includes means in said four-wire line termination circuit responsive to a signal from any one of the four-wire sets in said preselected group or said one four-wire telephone set to initiate a call to said associated switching center.

25. A system as set forth in claim 23 in which said four-wire line termination circuit includes jack means for receiving pre-programmed plugs, and which includes one pre-programmed plug for providing connections between said multi-line network and said four-wire line termination circuit to establish a party line circuit.

26. In a four-wire, multi-line telephone system including a plurality of four-wire telephone sets, each having a local line circuit and separate transmit and receive paths, a four-wire line termination circuit for connecting the four-wire transmit and receive paths of one of said telephone sets to a switching center, switching means associated with said one telephone set including connection means for selectively connecting the transmit and receive paths of said one telephone set to the transmit and receive paths of said four-wire line termination circuit, a multi-line network connected to said four-wire line termination circuit for establishing a party-line connection including said one four-wire telephone set and a pre-selected group of said plurality of four-wire telephone sets, said multi-line network and said line termination circuit being connected to extend signals indicating an off hook condition from the local line circuit of any one of said four wire telephone sets in said preselected group or said one multi-line set over the transmit path of each of the other of said four-wire multi-line telephone sets in said preselected group or said one multi-line set.

* * * * *